(12) United States Patent
Morise et al.

(10) Patent No.: US 8,745,120 B2
(45) Date of Patent: Jun. 3, 2014

(54) ADDER

(75) Inventors: Hirofumi Morise, Kanagawa-ken (JP);
Shiho Nakamura, Kanagawa-ken (JP);
Daisuke Saida, Tokyo (JP); Tsuyoshi Kondo, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 327 days.

(21) Appl. No.: 13/349,871

(22) Filed: Jan. 13, 2012

(65) Prior Publication Data

US 2012/0124120 A1     May 17, 2012

Related U.S. Application Data

(63) Continuation of application No. PCT/JP2009/066291, filed on Sep. 17, 2009.

(51) Int. Cl.
*G06F 7/50* (2006.01)
(52) U.S. Cl.
USPC .......................................................... 708/710
(58) Field of Classification Search
CPC .......... G06F 7/42; G06F 7/461; G06F 77/508
USPC ......................................... 708/710, 711, 712
See application file for complete search history.

(56) References Cited

U.S. PATENT DOCUMENTS

| | | | | |
|---|---|---|---|---|
| 4,245,330 A | * | 1/1981 | Rebourg ....................... | 708/820 |
| 4,449,193 A | * | 5/1984 | Tournois ....................... | 382/278 |
| 5,343,418 A | | 8/1994 | Zinger | |
| 2007/0296516 A1 | | 12/2007 | Eshaghian-Wilner et al. | |

FOREIGN PATENT DOCUMENTS

JP     56-147236     11/1981

OTHER PUBLICATIONS

Ikeda, "magnetic Tunnel Junctions for Spintronic Memories and Beyond". pp. 991-1002, 2007.*
Kostylev, M. P., et al.; "Spin-wave logical gates", Applied Physics Letters, 87, 2005.
International Search Report for International Application No. PCT/JP2009/066291 mailed on Oct. 27, 2009.
Written Opinion for International Application No. PCT/JP2009/066291.

\* cited by examiner

*Primary Examiner* — Chuong D Ngo
(74) *Attorney, Agent, or Firm* — Amin, Turocy & Watson, LLP

(57) ABSTRACT

According to an embodiment, an adder includes first and second wave computing units and a threshold wave computing unit. Each of the first and second wave computing units includes a pair of first input sections, a first wave transmission medium having a continuous film including a magnetic body connected to the first input sections, and a first wave detector outputting a result of computation by spin waves induced in the first wave transmission medium by the signals corresponding to the two bit values. The threshold wave computing unit includes a plurality of third input sections, a third wave transmission medium having a continuous film including a magnetic body connected to the third input sections, and a third wave detector a result of computation by spin waves induced in the third wave transmission medium.

20 Claims, 27 Drawing Sheets

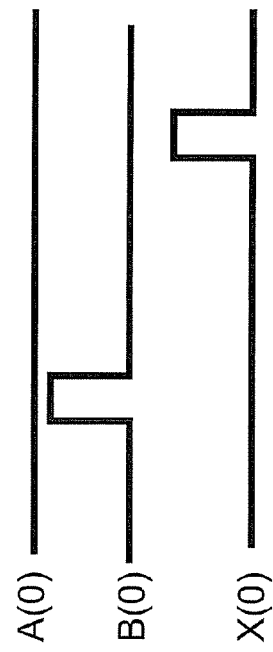
FIG. 9A
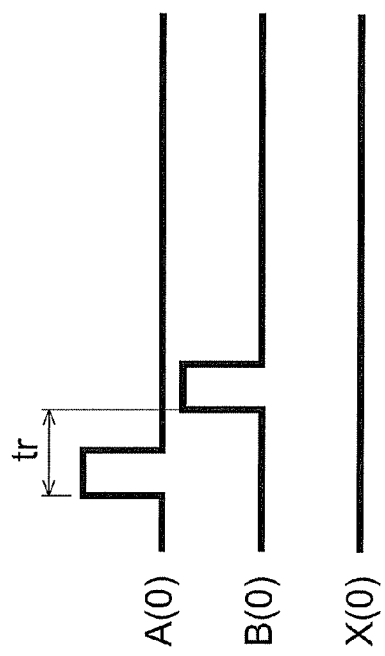
FIG. 9B
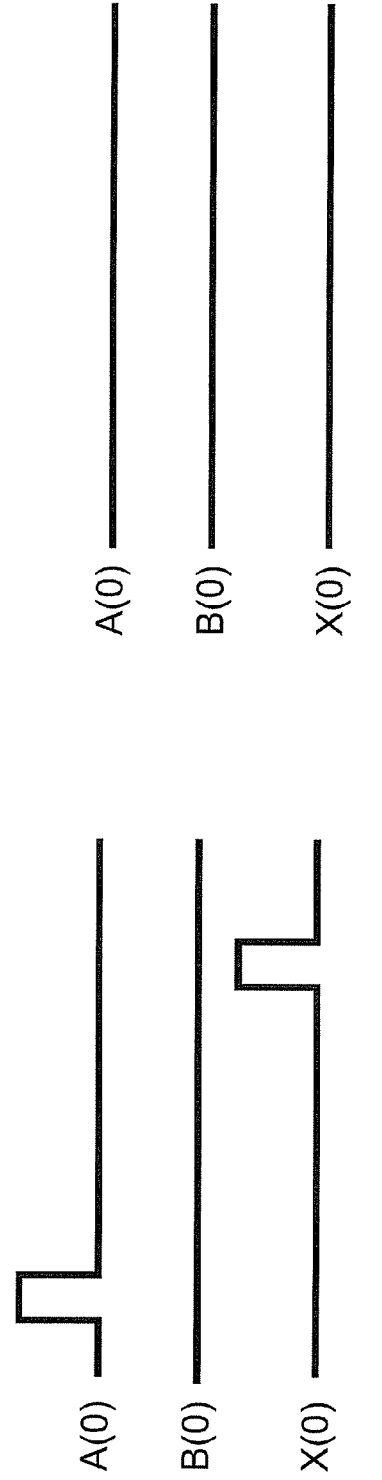
FIG. 9C
FIG. 9D

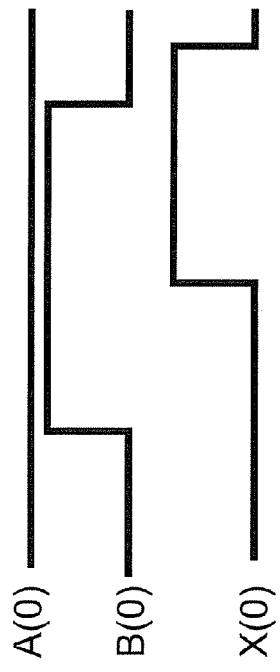
FIG. 10A
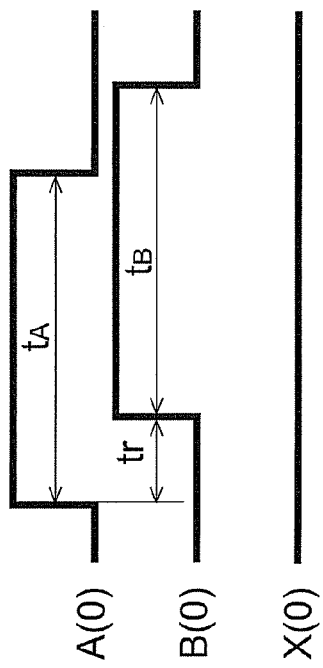
FIG. 10B
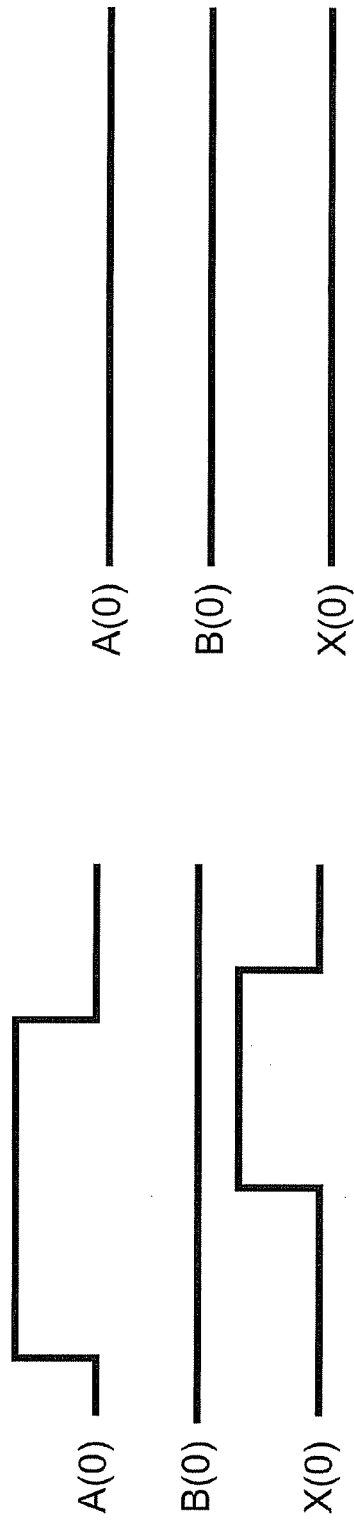
FIG. 10C
FIG. 10D

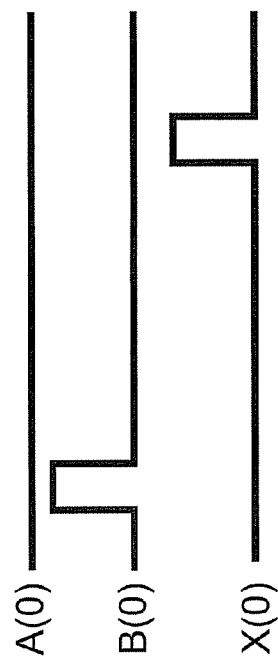
FIG. 12A
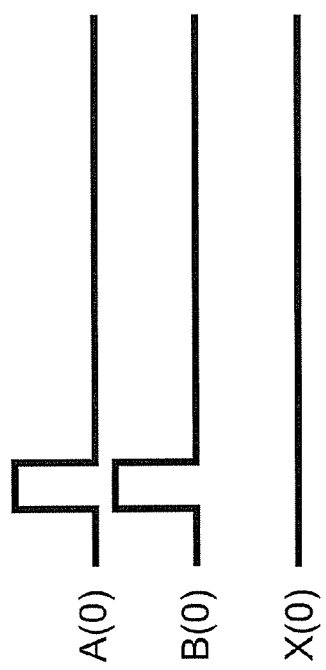
FIG. 12C
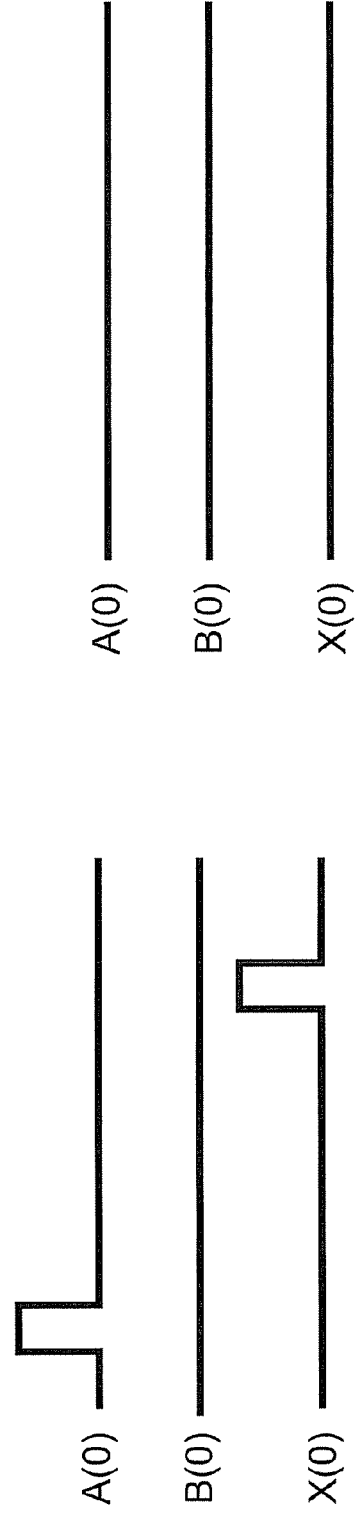
FIG. 12B
FIG. 12D

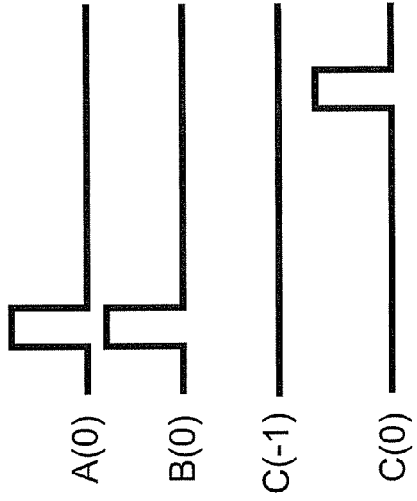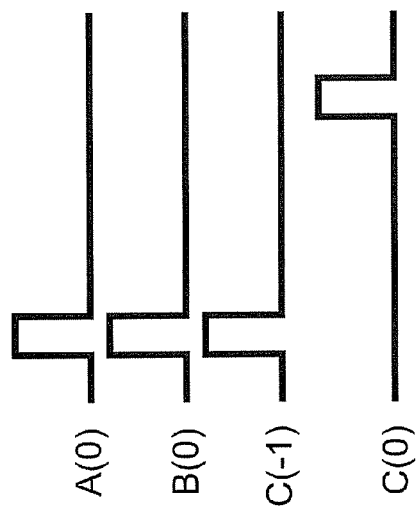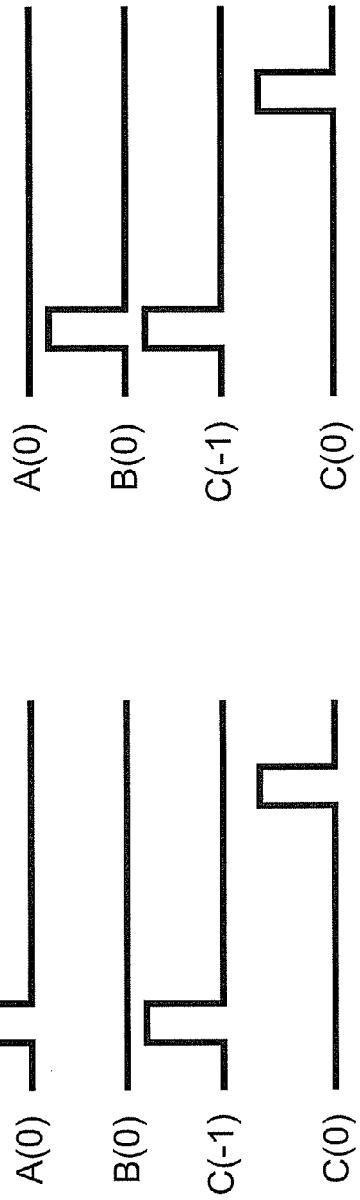
FIG. 14A  FIG. 14B  FIG. 14C  FIG. 14D

FIG. 15A
FIG. 15B
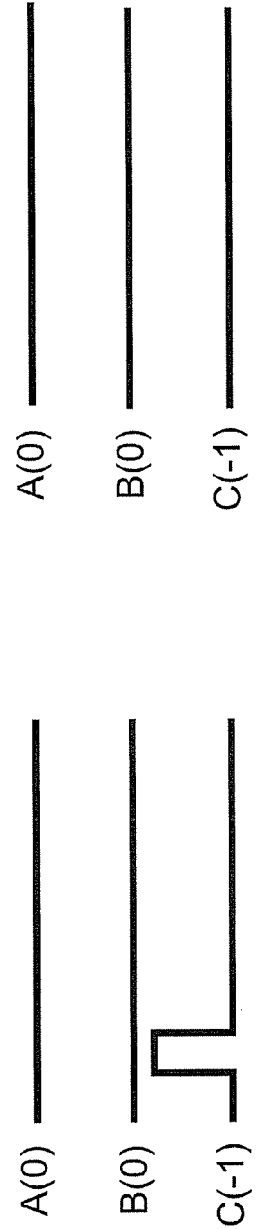
FIG. 15C
FIG. 15D

ADDER

CROSS-REFERENCE TO RELATED APPLICATIONS

This is a continuous application of International Application PCT/JP2009/066291, filed on Sep. 17, 2009; the entire contents of which are incorporated herein by reference.

FIELD

Embodiments described herein relate to an adder and, more particularly, to an adder using wave phenomena in a solid for logic operation.

BACKGROUND

An adder is one of the arithmetic logic units used in a computer. The adder performs multi-bit addition operation for e.g. integer and fixed-point or floating-point values. Furthermore, the adder also serves as a component of other arithmetic logic units, such as a subtractor and multiplier. Thus, the adder is required to have versatility and high speed performance.

In a multi-bit adder, the propagation time of a carry signal from a less significant position to a more significant position limits the overall processing speed of the adder. Thus, circuit techniques such as the carry look-ahead scheme for performing carry operation for a more significant position in advance have been used to enhance the speed. On the other hand, from the viewpoint of increasing the operating speed of the logic element itself, miniaturizing the CMOS device have been used to enhance its operating speed.

However, the circuit size is increased in the CMOS circuit equipped with the carry look-ahead scheme. Furthermore, the physical limit in the miniaturization technology is also coming into sight as an inevitable reality. Moreover, with the increase in circuit size and the miniaturization, the increase in dynamic power consumption due to parasitic capacitance and the increase in static power consumption due to leakage current are emerging as major problems. Thus, there is a strong demand for a technique for limiting the power consumption to within a desired range to enhance the speed of computation processing.

One of the potential approaches aiming to break the limits of existing techniques is the so-called "Beyond CMOS" technology, which is not necessarily based on the Boolean algebra and CMOS architecture. This technology includes approaches for information processing without charge movement, such as optics, magnetic spin, and biotechnology. In particular, the spin wave is a space-time fluctuation of a magnetic moment in a magnetic body. The spin wave can be generated by low energy in principle, and is a high-speed oscillation phenomenon above GHz. Thus, a spin wave-based logic element is a promising candidate for future practical application as a power-saving information processing device. Examples of the spin wave-based logic element are disclosed in United States Patent Application Publication No. 2007/0296516 and Applied Physics Letters 87, 153501 (2005). However, the method for configuring an adder with suppressed increase in circuit size has not been known.

BRIEF DESCRIPTION OF THE DRAWINGS

FIGS. 9A to 9D are timing charts illustrating a relationship between input signals and an output signal in the computing units 1 and 2 according to the first embodiment;

FIGS. 10A to 10D are alternative timing charts illustrating a relationship between input signals and an output signal in the computing units 1 and 2 according to the first embodiment;

FIGS. 12A to 12D are timing charts illustrating alternative example of the computing units 1 and 2 according to the first embodiment;

FIGS. 14A to 15D are timing charts illustrating a relationship between input signals and an output signal in the computing unit 3 according to the first embodiment;

DETAILED DESCRIPTION

Figure 1:
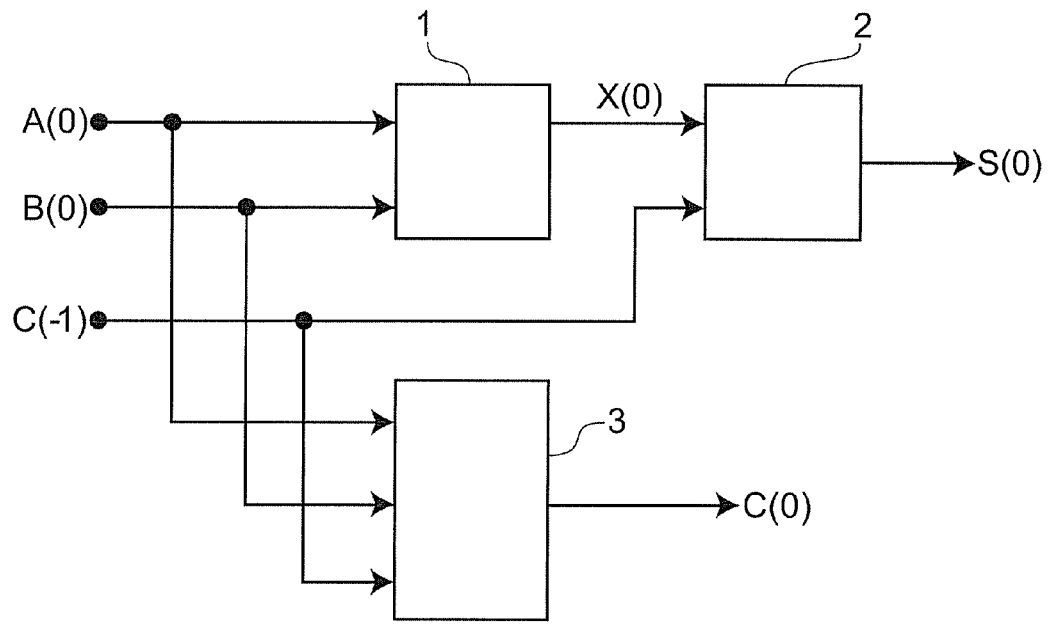
FIG. 1 is a block diagram schematically illustrating a 1-bit adder according to a first embodiment.

According to an embodiment, an adder includes a first wave computing unit, a second wave computing unit and a threshold wave computing unit. The first wave computing unit includes a pair of first input sections receiving signals corresponding to two bit values selected from A[i+k−1], B[i+k−1] and C[i+k−2], wherein the A[i+k−1] is the bit value of the (i+k−1)-th position of a binary value A; the B[i+k−1] is the bit value of the (i+k−1)-th position of the binary value B; and the C[i+k−2] is a carry bit value from the (i+k−2)-th position to the (i+k−1)-th position resulting from addition of the binary value A and the binary value B (i and k being integers). The first wave computing unit includes a first wave transmission medium having a continuous film including a magnetic body connected to the first input sections and a first wave detector outputting X(k−1) as a result of computation by spin waves induced in the first wave transmission medium by the signals corresponding to the two bit values. The second wave computing unit includes a pair of second input sections receiving a signal corresponding to the bit value not selected as the input to the first input sections among the A[i+k−1], B[i+k−1] and C[i+k−2], and the output X(k−1), a second wave transmission medium having a continuous film including a magnetic body connected to the second input sections, and a second wave detector outputting S(k−1) as a result of computation by spin waves induced in the second wave transmission medium by the signal corresponding to the bit value not selected and the output X(k−1). The threshold wave computing unit includes a plurality of third input sections receiving signals corresponding to the A[i] to A[i+k−1], the B[i] to B[i+k−1], and the carry bit value C[i−1], a third wave transmission medium having a continuous film including a magnetic body connected to the third input sections, and a third wave detector outputting C(k−1) as a result of computation by spin waves induced in the third wave transmission medium by the signals corresponding to the A[i] to A[i+k−1], B[i] to B[i+k−1], and C[i−1].

Embodiments of the invention will now be described with reference to the drawings. In the following embodiments, like portions in the drawings are labeled with like reference numerals, and the detailed description thereof is omitted as appropriate. The different portions are described as appropriate.

An adder according to an embodiment of the invention includes a first wave computing unit, a second wave computing unit, and a threshold wave computing unit.

The first wave computing unit includes a pair of first input sections, a first wave transmission medium connected to the first input section, and a first wave detector. The first input sections receives input of signals corresponding to two bit values selected from bit values A[i+k−1], B[i+k−1], and C[i+k−2]. The bit values A[i+k−1] and B[i+k−1] are taken from among the bit values of the i-th to (i+m−1)-th positions of binary values A and B (where i and m are integers). The bit value C[i+k−2] is the carry bit value from the (i+k−2)-th position to the (i+k−1)-th position resulting from the addition of the two binary values A and B. Here, the least significant position is referred to as zeroth position. The i-th position refers to the (i+1)-th bit counting from the least significant position. Furthermore, k is an integer of 1 to m.

On the other hand, the first wave detector outputs X(k−1) as a result of computation by waves induced in the first wave transmission medium by the signals corresponding to the two bit values inputted to the first input sections.

The second wave computing unit includes a pair of second input sections, a second wave transmission medium connected to the second input sections, and a second wave detector. The second input sections receive a signal corresponding to the bit value not selected as the input to the first input sections among A[i+k−1], B[i+k−1] and C[i+k−2], and the output X(k−1) of the first wave computing unit. On the other hand, the second wave detector outputs S(k−1) as a result of computation by waves induced in the second wave transmission medium by the signal corresponding to the unselected bit value and the output X(k−1).

Furthermore, the threshold wave computing unit includes a plurality of third input sections, a third wave transmission medium connected to the third input sections, and a third wave detector. The third input sections receive signals corresponding to the bit values A[i] to A[i+k−1], the bit values B[i] to B[i+k−1], and the carry bit value C[i−1]. The bit values A[i] to A[i+k−1] and the bit values B[i] to B[i+k−1] are the bit values of the i-th to (i+k−1)-th positions of the binary values A and B. On the other hand, the third wave detector outputs C(k−1) as a result of computation by waves induced in the third wave transmission medium by the signals corresponding to A[i] to A[i+k−1], B[i] to B[i+k−1], and C[i−1].

(First Embodiment)

FIG. 1 is a block diagram schematically showing the configuration of a 1-bit adder according to a first embodiment. In particular, FIG. 1 corresponds to the case of m=1, k=1. A(0) and B(0) are signals corresponding to the bit value A[i] and the bit value B[i] of the i-th position of n-bit (n is an integer of 1 or more) binary values A and B. C(−1) is the carry signal from a less significant position corresponding to the carry bit value C[i−1] from the (i−1)-th position to the i-th position. These are all given as electrical signals for one of the inputs represented by "0" corresponding to the bit value 0 or "1" corresponding to the bit value 1. Here, i is one of the integers 0 to n−1. For i equal to 0, C(−1) is an electrical signal corresponding to "0".

The computing units 1, 2, and 3 shown in FIG. 1 are multi-input logic units. The computing unit 1 is the first wave computing unit. In response to input of A(0) and B(0), the computing unit 1 outputs an intermediate output X(0). The computing unit 2 is the second wave computing unit. The computing unit 2 receives as input the outputs X(0) and C(−1) of the computing unit 1, and outputs S(0). The computing unit 3 is the threshold wave computing unit. The computing unit 3 receives A(0), B(0), and C(−1) as input, and outputs C(0).

TABLE 1 is the truth table of the computing unit 1, and TABLE 2 is the truth table of the computing unit 2. That is, the computing units 1 and 2 perform exclusive OR operation. TABLE 3 shows the truth table of the computing unit 3. The computing unit 3 performs a threshold logic operation. More specifically, the computing unit 3 performs the operation of outputting 1 if the sum of the three numbers is 2 or more, and outputting 0 if the sum is 1 or less. These truth tables show the bit values A[i], B[i] of the binary values A and B, the carry bit value C[i−1], and the bit values S[i], X[i], and C[i] corresponding to the computation results. These tables correspond to the relationships between the signals A(0), B(0), and C(−1) inputted to the computing units and the computation results S(0), X(0), and C(0). This also applies to TABLES 4 to 7 described below.

TABLE 1

| A[i] | B[i] | X[i] |
|---|---|---|
| 0 | 0 | 0 |
| 1 | 0 | 1 |
| 0 | 1 | 1 |
| 1 | 1 | 0 |

TABLE 2

| X[i] | C[i − 1] | S[i] |
|---|---|---|
| 0 | 0 | 0 |
| 1 | 0 | 1 |
| 0 | 1 | 1 |
| 1 | 1 | 0 |

TABLE 3

| A[i] | B[i] | C[i − 1] | C[i] |
|---|---|---|---|
| 0 | 0 | 0 | 0 |
| 1 | 0 | 0 | 0 |
| 0 | 1 | 0 | 0 |
| 1 | 1 | 0 | 1 |
| 0 | 0 | 1 | 0 |
| 1 | 0 | 1 | 1 |
| 0 | 1 | 1 | 1 |
| 1 | 1 | 1 | 1 |

TABLE 4 is the truth table summarizing the relationship between the inputs and the outputs of the computing units 1, 2, and 3 according to this embodiment. As seen from TABLE 4, the output does not change even if A(0), B(0), and C(−1) are interchanged. For instance, even if B(0) and C(−1) are interchanged, the outputs S(0) and C(0) remain the same.

TABLE 4

| A[i] | B[i] | C[i − 1] | S[i] | C[i] |
|---|---|---|---|---|
| 0 | 0 | 0 | 0 | 0 |
| 1 | 0 | 0 | 1 | 0 |
| 0 | 1 | 0 | 1 | 0 |
| 0 | 0 | 1 | 1 | 0 |
| 1 | 1 | 0 | 0 | 1 |
| 0 | 1 | 1 | 0 | 1 |
| 1 | 0 | 1 | 0 | 1 |
| 1 | 1 | 1 | 1 | 1 |

Figure 2:
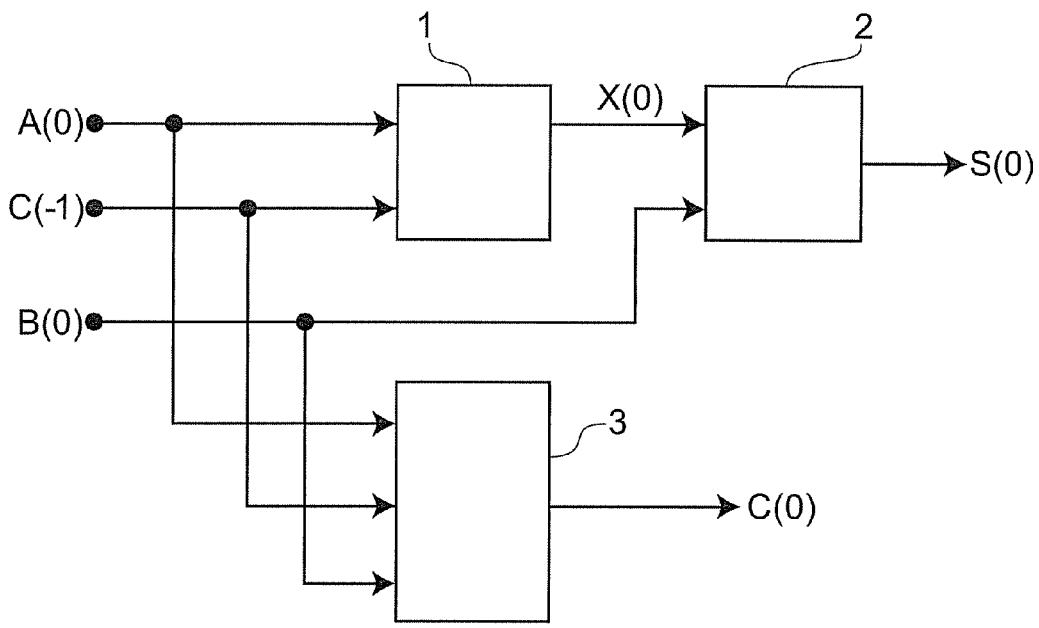
FIG. 2 is a block diagram schematically illustrating a variation of the 1-bit adder according to the first embodiment.

FIG. 2 is a block diagram schematically showing a variation of the 1-bit adder according to the first embodiment. This variation is configured so that the inputs B(0) and C(−1) of the adder shown in FIG. 1 are interchanged. That is, in this configuration, A(0) and C(−1) are inputted to the computing unit 1, and the output X(0) of the computing unit 1 and B(0) are inputted to the computing unit 2.

Next, the configuration of the computing units 1 to 3 according to the embodiment is described.

These computing units include, as their components, film-like media (hereinafter referred to as continuous films) serving as the first wave transmission media to the third wave transmission media, the first input sections to the third input sections to which electrical signals corresponding to the input bit values of the computing unit can be applied respectively, and the first wave detector to the third wave detector provided on the respective continuous films, and each of the wave detectors is capable of extracting an electrical signal corresponding in magnitude to the local amplitude of the wave.

(Example of the Wave Computing Unit)

Figure 3A:
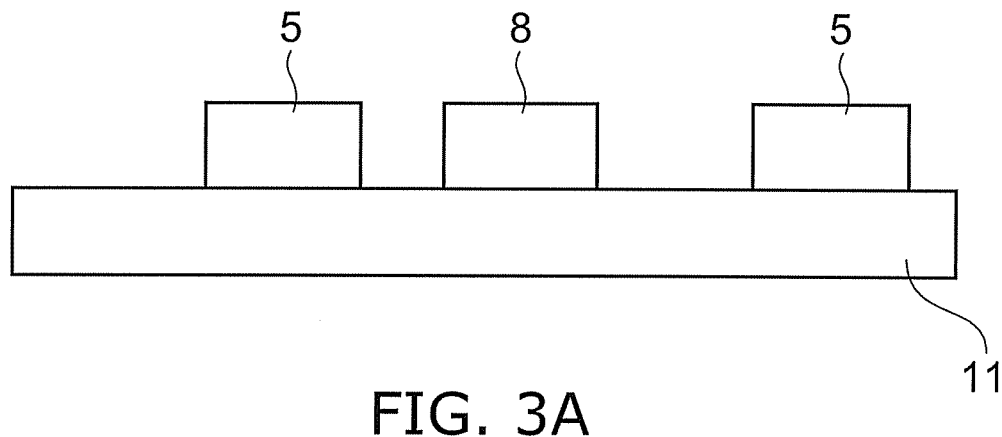
FIGS. 3A and 3B are schematic views illustrating one of the computing units 1 and 2 according to the first embodiment.
Figure 3B:
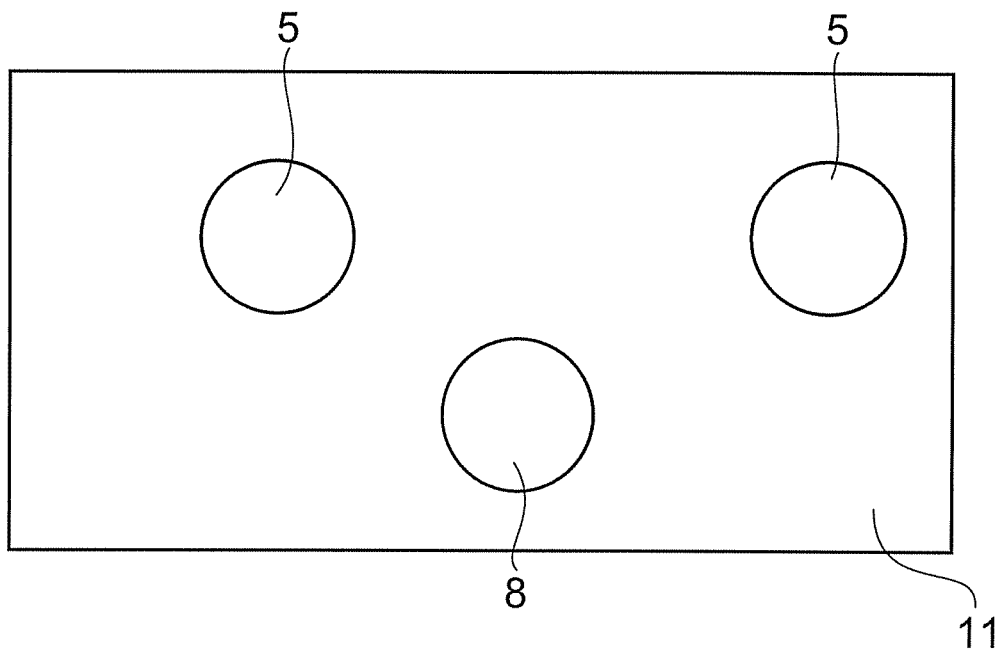

FIGS. 3A and 3B are schematic views showing one of the computing units 1 and 2 according to the embodiment. FIG. 3A shows a front view, and FIG. 3B shows a plan view.

The computing unit shown in FIGS. 3A and 3B is a wave computing unit. A continuous film 11 is provided on a substrate, not shown. Two input sections 5 and a wave detector 8 for detecting a spin wave are provided on the continuous film 11. The continuous film 11 includes at least one magnetic layer exhibiting ferromagnetism at room temperature.

The input section 5 is provided so as to have a prescribed contact interface with the continuous film 11. The input section 5 applies a voltage or passes a current in a direction generally perpendicular to the surface of the continuous film 11. This generates spin torque in a region immediately below the input section 5. Thus, a spin wave can be excited in the magnetic layer constituting the continuous film 11 and a half wavelength of the spin wave is almost the same as the diameter of the contact interface. The excited spin wave propagates outward from the input section 5 in the magnetic layer through the magnetostatic interaction or the exchange interaction.

The contact interface at which the input section 5 and the continuous film 11 are electrically connected is preferably smaller than a circle having a diameter of 200 nm. If the contact interface is larger than a circle having a diameter of 200 nm, a vortex-like or multi-domain magnetization structure is excited. This produces a complicated structure in which the spin wave includes a plurality of components, and the spin wave becomes difficult to control. Furthermore, by downsizing the input section 5, the overall computing unit can be downsized.

For these reasons, the contact interface of the input section 5 is preferably shaped like an ellipse, circle, or polygon having a major side length of 200 nm or less. Within this range, the computation by the excited spin waves is easy to control.

Figure 4A:
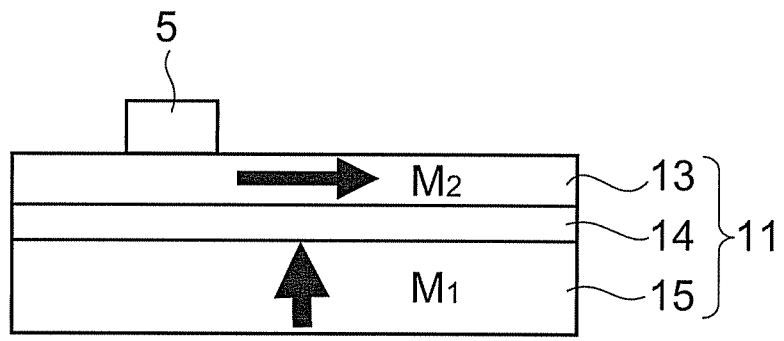
FIGS. 4A to 4C are schematic views illustrating partial cross-sections including an input section in the computing units 1 and 2 according to the first embodiment.
Figure 4B:
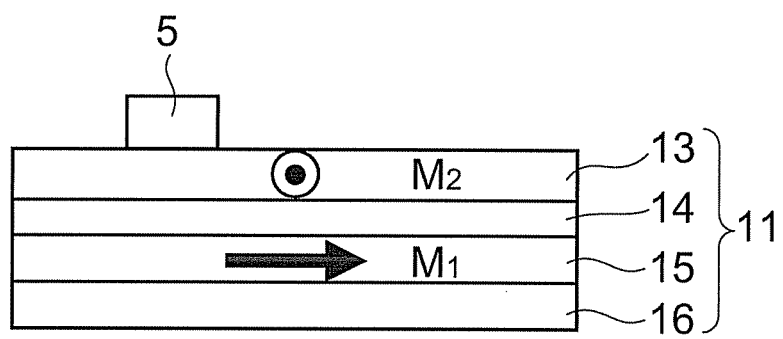
Figure 4C:
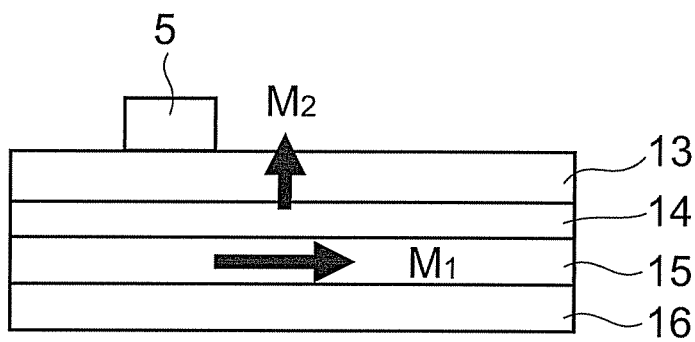

FIGS. 4A to 4C are schematic views showing partial cross sections of the input section 5 and the continuous film 11. In the cross-sectional structure shown in FIG. 4A, the continuous film 11 is configured in a layer structure of a magnetic layer 13, a spacer layer 14, and a magnetic layer 15 from the surface. The input section 5 is made of a non-magnetic conductive material. The input section 5 is provided on the surface of the continuous film 11.

The magnetic layer 13 serves as a transmission medium for the spin wave. The current flowing from the input section 5 via the magnetic layer 13 causes the magnetic layer 15 to impart spin torque to the magnetic layer 13 and to excite a spin wave. The spin torque imparted to the magnetic layer 13 depends on the angle between the magnetization direction M2 of the magnetic layer 13 and the magnetization direction M1 of the magnetic layer 15. When this angle is 0° or 180°, the magnitude of the spin torque is small. Thus, the spin wave is excited when the large enough current is supplied. On the other hand, the spin torque continuously changes while the angle between M1 and M2 changes from 0° to 180°. Within this range, there exists an angle between M1 and M2 maximizing the spin torque.

The polarity of the voltage applied to the input section 5, or the direction of the current flowing between the input section 5 and the magnetic layer 15, in relation to the magnetization directions of the magnetic layers 13 and 15, are preferably selected so as to increase the spin torque.

The angle maximizing the spin torque may be included in the range of the magnetization direction M1 of the magnetic layer 15 being 60° to 120° with respect to the magnetization direction M2 of the magnetic layer 13. Hence, by setting the angle between M1 and M2 to within this range, a configuration of imparting spin torque can be realized with lower current.

For instance, in the structure shown in FIG. 4A, the magnetization direction M2 of the magnetic layer 13 is directed parallel to the surface of the continuous film 11. The magnetization direction M1 of the magnetic layer 15 is directed perpendicular to the surface of the continuous film. In FIG. 4B, the magnetization direction M2 of the magnetic layer 13 and the magnetization direction M1 of the magnetic layer 15 are both directed parallel to the surface of the continuous film 11, and may be made roughly orthogonal to each other in the plane of the continuous film 11. In FIG. 4C, the magnetization direction M2 of the magnetic layer 13 is made perpendicular to the surface of the continuous film 11. The magnetization direction of the magnetic layer 15 is made parallel to the surface of the continuous film 11.

Among the structures shown in FIGS. 4A to 4C, the magnetization direction M2 of the magnetic layer 13 is preferably made roughly perpendicular to the surface of the continuous film 11 as in FIG. 4C. This can provide the advantage that the propagation characteristic of the spin wave is isotropic in the plane of the continuous film 11 and independent of the propagation direction. Furthermore, the magnetic layer 13 is a spin wave transmission medium. Thus, the magnetic layer 13 is preferably made of a material being capable of efficiently receiving spin torque and having low transmission loss.

Examples of the magnetic material magnetized perpendicular to the surface of the continuous film 11 can include alloys such as FeVPd, FeCrPd, and CoFePt. Alternatively, a ferrite oxide such as yttrium iron garnet (YIG) and manganese ferrite can be used to reduce the transmission loss of the spin wave.

On the other hand, the magnetic layer 15 preferably has a pinned magnetization direction in order to impart a fixed spin torque to the magnetic layer 13. To this end, the layer thickness of the magnetic layer 15 is preferably set to 10 nm or more. Alternatively, as shown in FIGS. 4B and 4C, an antiferromagnetic layer 16 can be provided adjacent to the magnetic layer 15 to pin the magnetization direction M1 of the magnetic layer 15.

The material of the magnetic layer with the magnetization direction made roughly parallel to the surface of the continuous film 11 can be a magnetic alloy containing at least one element selected from the group consisting of iron (Fe), cobalt (Co), nickel (Ni), manganese (Mn), and chromium (Cr), for example. The antiferromagnetic layer 16 may be made of an IrMn alloy.

The spacer layer 14 is provided to be thinner than the length by which the electron loses its spin polarization, while moving between the magnetic layer 13 and the magnetic layer 15, i.e. the spin diffusion length. Furthermore, the continuous film 11 may include, as the uppermost layer, a protective film formed on the magnetic layer 13. Preferably, in order to efficiently excite a spin wave, the protective film is conductive and has a thickness of 100 nm or less.

The spacer layer 14 may be made of a tunnel barrier material or a non-magnetic metal material. By using a tunnel barrier material, a large reproduction signal can be obtained as the output at read time. For instance, the tunnel barrier material can be an oxide, nitride, fluoride, or oxynitride containing at least one element selected from the group consisting of aluminum (Al), titanium (Ti), zinc (Zn), zirconium (Zr), tantalum (Ta), cobalt (Co), nickel (Ni), silicon (Si), magnesium (Mg), and iron (Fe). Alternatively, it is also possible to use a semiconductor having a large energy gap such as GaAlAs.

On the other hand, a non-magnetic metal material can be used for the space layer 14 to facilitate current injection for generating spin torque. For instance, the non-magnetic metal material may be selected from a group of copper (Cu), gold (Au), silver (Ag), aluminum (Al), and an alloy that contains at least one element of Cu, Au, Ag and Al. In this case, setting the thickness of the spacer layer to 1.5 nm or more and 20 nm or less can avoid interlayer coupling between the magnetic layer 13 and the magnetic layer 15, and retain the spin polarization of electrons.

Furthermore, the protective film provided on the uppermost layer of the continuous film 11 can be made of a material such as Ta, Ru, copper (Cu), gold (Au), silver (Ag), aluminum (Al), grapheme and an alloy that contains at least one element selected from the group of Ta, Ru, Cu, Au, Ag and Al.

The non-magnetic conductive material used for the input section 5 can be e.g. copper (Cu), gold (Au), silver (Ag), aluminum (Al), or an alloy that contains at least one element selected from the group consisting thereof. Alternatively, the non-magnetic conductive material can be a material such as carbon nanotube, carbon nanowire, and graphene.

Figure 5A:
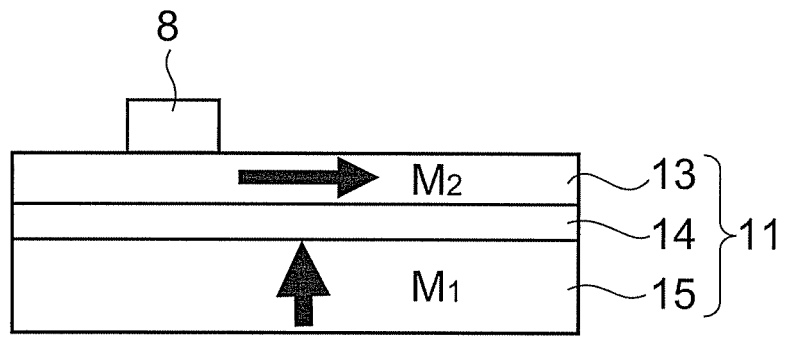
FIGS. 5A to 5C are schematic views illustrating partial cross-sections including a wave detector in the computing units 1 and 2 according to the first embodiment.
Figure 5B:
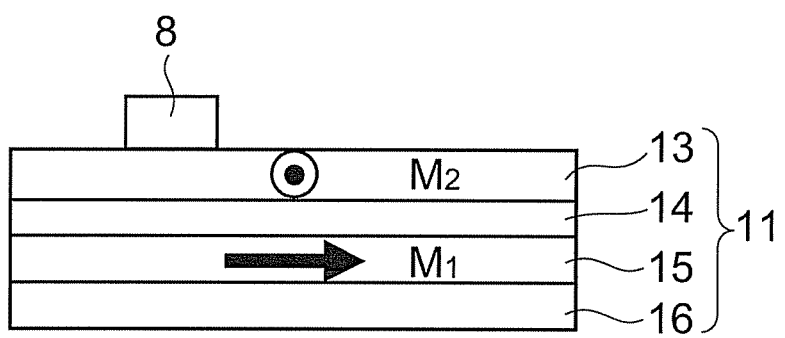
Figure 5C:
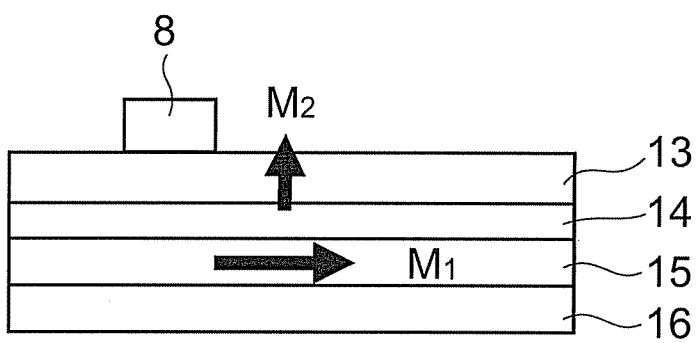

FIGS. 5A to 5C are schematic views showing partial cross sections of the wave detector 8 and the continuous film 11. The wave detector 8 is provided on the continuous film 11 via a contact interface. The spin wave generated immediately below the input section 5 and propagated in the continuous film 11 is detected as a composite signal in the wave detector 8. The each set of magnetization directions in FIGS. 5A to 5C correspond respectively to the structures of the partial cross sections of the continuous film 11 shown in FIGS. 4A to 4C. That is, on the input section 5 side and on the wave detector 8 side, the magnetization directions of the magnetic layers 13 and 15 included in the continuous film 11 are the same.

In FIG. 5A, the magnetization direction M1 of the magnetic layer 15 is directed perpendicular to the surface of the continuous film 11. The magnetization direction M2 of the magnetic layer 13 is directed parallel to the surface of the continuous film 11. In FIG. 5B, the magnetization direction M1 of the magnetic layer 15 and the magnetization direction M2 of the magnetic layer 13 are both parallel to the surface of the continuous film 11. Furthermore, M1 and M2 are orthogonal in the plane of the continuous film 11. In FIG. 5C, the magnetization direction M1 of the magnetic layer 15 is parallel to the surface of the continuous film 11. The magnetization direction M2 of the magnetic layer 13 is directed perpendicular to the surface of the continuous film 11.

The continuous film 11 shown in FIGS. 5A to 5C has a structure in which the spacer layer 14 is sandwiched between the magnetic layers 13 and 15. By applying a voltage or passing a current from the wave detector 8 to the continuous film 11, a change in magnetization, i.e., spin wave, can be detected by the TMR effect (tunnel magnetoresistance effect) or GMR effect (giant magnetoresistance effect). Typically, the signal variation resulting from the spin wave is small. Hence, preferably, the magnetization directions of the two magnetic layers 13 and 15 are made roughly orthogonal as in one of the structures shown in FIGS. 5A to 5C to enhance the detection sensitivity. In particular, the magnetization arrangement shown in FIG. 5B is preferable, because the magnetizations of the magnetic layer 13 and 15 are both directed in the plane and suitable to detect the in-plane variation of the magnetization direction of the magnetic layer 13.

Figure 6:
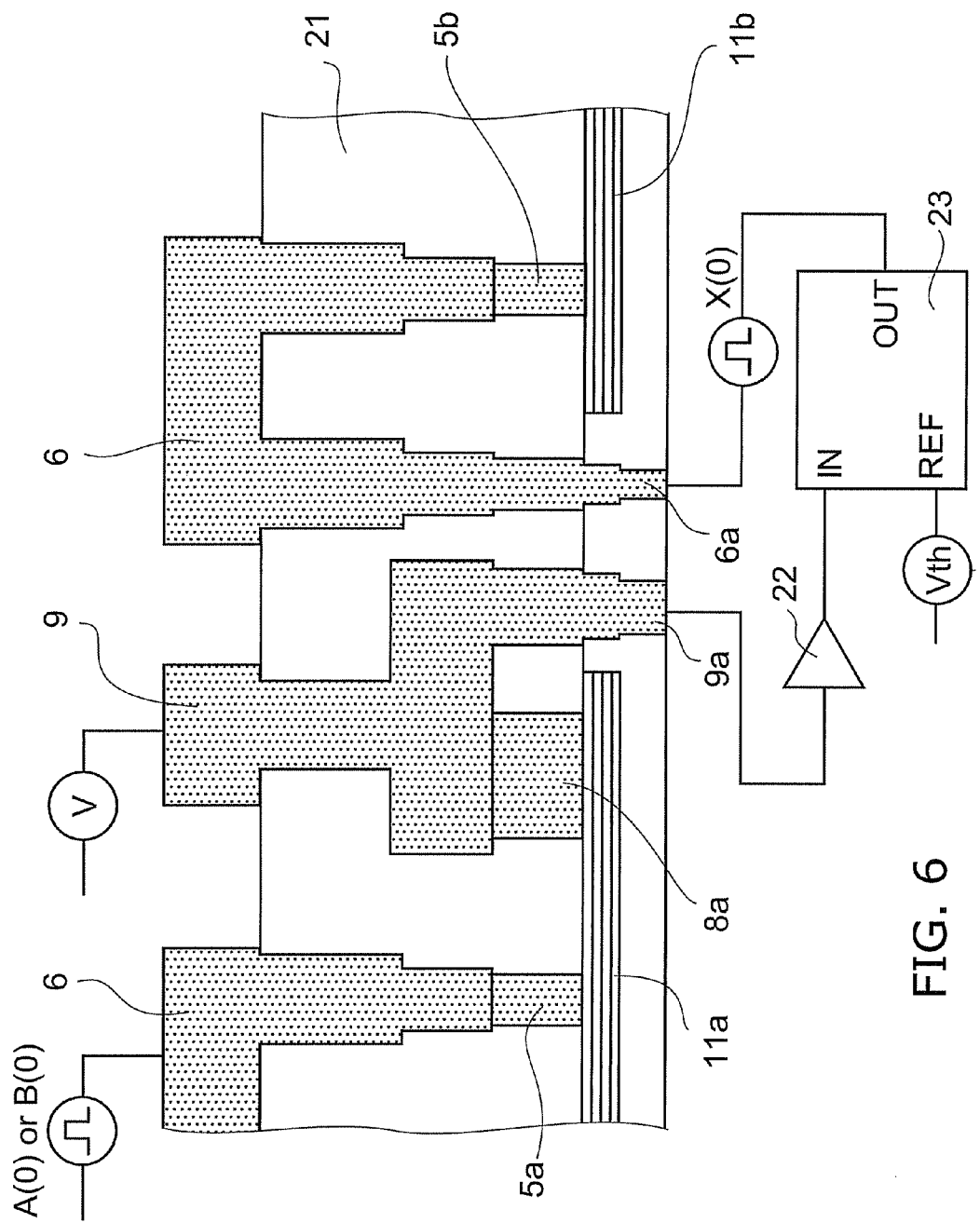
FIG. 6 is a schematic view illustrating a partial cross section of an adder according to the first embodiment.

FIG. 6 is a schematic view showing a partial cross section of the adder according to the embodiment.

On a substrate, not shown, continuous films 11a and 11b are provided via an insulating film. An input section 5a and a wave detector 8a are connected to the surface of the continuous film 11a. The continuous film 11a, the input section 5a, and the wave detector 8a constitute e.g. a computing unit 1. Furthermore, an input section 5b and a wave detector, not shown, are connected to the continuous film 11b and constitute a computing unit 2.

An input electrode 6 is connected to the input section 5a. An electrical signal corresponding to e.g. the input A(0) or B(0) is applied to the input electrode 6. As a result, a spin wave is excited immediately below the input section 5a and propagated along the continuous film 11a toward the wave detector 8a. On the other hand, an output electrode 9 is connected to the wave detector 8a. For instance, a bias voltage for producing the TMR effect is applied to the wave detector 8a. Thus, the spin wave propagated from the input section 5a is detected as change in the voltage generated by the TMR effect, and outputted as a voltage signal from the substrate side terminal 9a of the output electrode 9.

Furthermore, the voltage signal outputted from the terminal 9a is amplified in an amplifier 22 and inputted to a comparator 23. In the comparator 23, the inputted voltage signal is compared with a threshold voltage Vth. For instance, if the voltage signal is larger than the threshold voltage Vth, the comparator 23 outputs a corresponding voltage signal.

The output of the comparator 23 is inputted to a terminal 6a of the input electrode 6 connected to the input section 5b provided on the continuous film 11b. That is, the output of the comparator 23 corresponds to e.g. X(0) outputted from the computing unit 1, and is inputted to the input terminal 6a of the computing unit 2.

The amplifier 22 and the comparator 23 can be placed on the same plane as the continuous films 11a and 11b, or placed above or below the insulating film 21 shown in FIG. 6. For instance, as shown in FIG. 6, the amplifier 22 and the comparator 23 can be placed below the continuous film 11 to increase the packing density of computing units. Specifically, an integrated circuit including the amplifier 22 and the comparator 23 is formed in the surface of a silicon substrate. Subsequently, the continuous film 11, the input section 5, the wave detector 8 and the like are formed. Then, electrical connection can be configured as shown in FIG. 6.

Figure 7A:
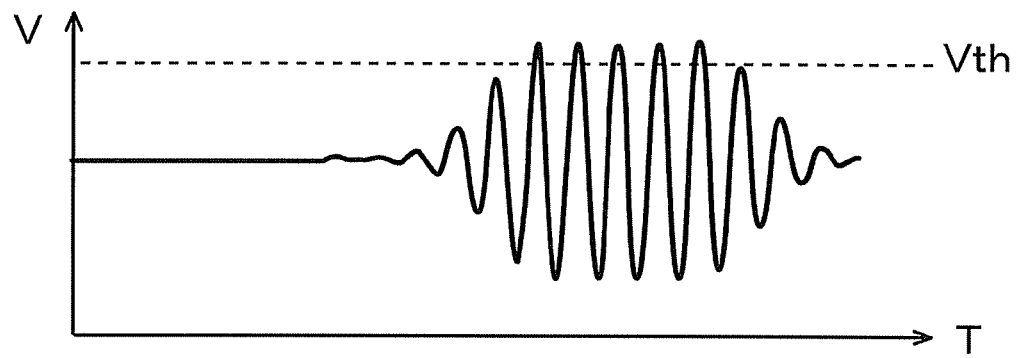
FIGS. 7A and 7B are schematic diagrams illustrating examples of a voltage signal outputted from the computing units 1 and 2 according to the first embodiment.
Figure 7B:
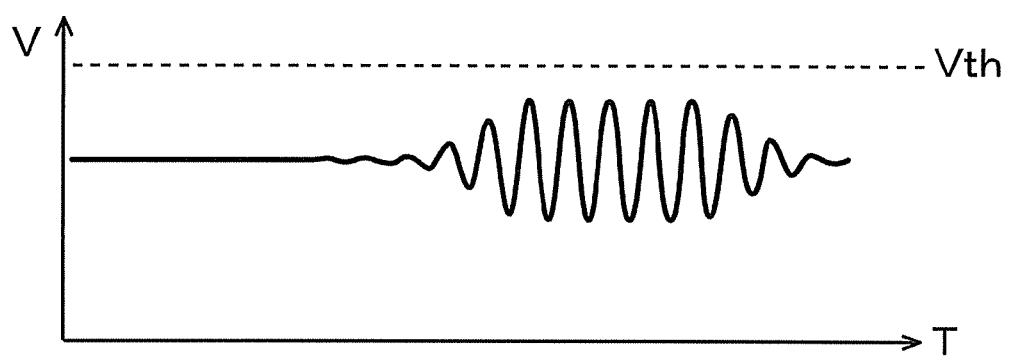

FIGS. 7A and 7B are schematic diagrams showing examples of the voltage signal outputted from the terminal 9a of the output electrode 9 shown in FIG. 6. FIG. 7A shows a voltage waveform in the case where the amplitude of the spin wave detected in the wave detector 8 is relatively large. FIG. 7B shows a voltage waveform in the case where the amplitude of the spin wave is relatively small. In general, in the TMR effect or GMR effect, the electrical resistance of the stacked film including two or more magnetic layers changes with the relative angle between the magnetization directions of the magnetic layers. The amplitude of the spin wave is a temporal change in magnetization direction. Hence, depending on the magnitude of the amplitude of the spin wave propagated in the magnetic layer 13, the relative angle between the magnetization direction of the magnetic layer 13 and the magnetization direction of the magnetic layer 15 changes. This changes the resistance of the continuous film 11 (see FIGS. 5A to 5C). Hence, a larger amplitude of the spin wave excited in the input section 5a results in a larger resistance change of the continuous film 11 immediately below the wave detector 8, and a larger change in the voltage outputted to the terminal 9a.

For instance, the voltage signal shown in FIGS. 7A and 7B is inputted to the input terminal (IN) of the comparator 23 shown in FIG. 6. As a threshold voltage, Vth shown in FIGS. 7A and 7B is inputted to the input terminal (REF) of the reference voltage. The comparator 23 can be configured so as to output a voltage corresponding to 1 if the magnitude of the signal inputted to the input terminal (IN) exceeds Vth, and to output a voltage corresponding to 0 if the magnitude of the signal inputted to the input terminal (IN) does not exceed Vth. Thus, the comparator 23 outputs a signal voltage corresponding to 1 only during the time when the signal voltage exceeds Vth as shown in FIG. 7A.

In the configuration shown in FIG. 6, the voltage signal outputted from the terminal 9a of the output electrode 9 is amplified in the amplifier 22. Alternatively, the voltage signal may be inputted directly to the input terminal (IN) of the comparator 23 in the case where the resistance change detected in the wave detector 8 is sufficiently large. The comparator 23 and the amplifier 22 may be provided using the integrated circuit technology.

Next, the arrangement of the input section 5 and the wave detector 8 in the computing units 1 and 2 is described. If the magnetization direction of the magnetic layer 13 included in the continuous film 11 is made perpendicular to the surface of the continuous film 11, the propagation characteristic of the spin wave is made isotropic (see FIG. 4C). Furthermore, the magnetic layer 13 made of a material with low transmission loss of the spin wave may ease restrictions to the arrangement of the input section 5 and the wave detector 8 and allows various arrangements.

Figure 8A:
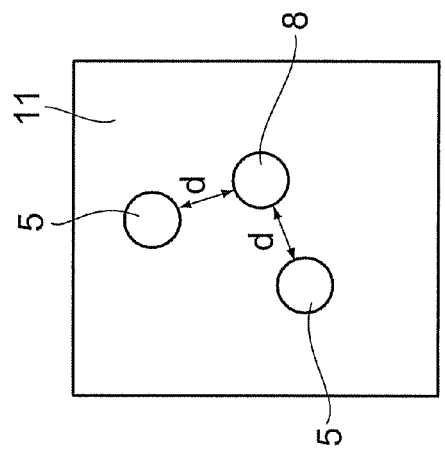
FIGS. 8A to 8D are schematic plan views illustrating examples of the computing units 1 and 2 according to the first embodiment.
Figure 8B:
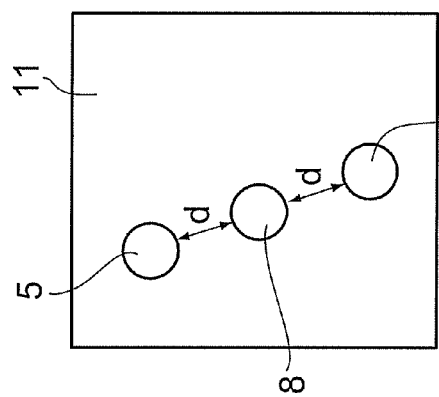
Figure 8C:
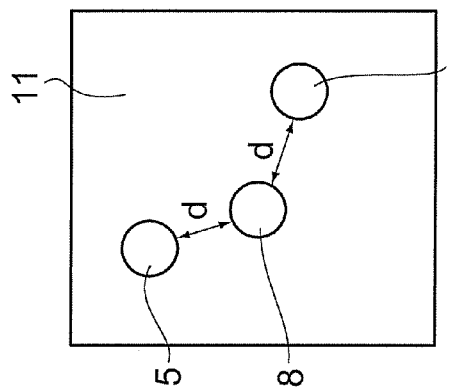

FIGS. 8A to 8D are schematic views showing arrangement examples of two input sections 5 and a wave detector 8 in the computing units 1 and 2. FIGS. 8A to 8C show arrangement examples of equal spacing d between the wave detector 8 and the input section 5. As shown in FIG. 8B, the wave detector 8 and the input sections 5 may be placed on a straight line. Alternatively, as shown in FIGS. 8A and 8C, the input sections 5 may be arbitrarily arranged at positions with equal spacing from the wave detector 8. In such arrangements, the time taken for spin waves generated in the two input sections 5 to propagate in the continuous film 11 to the wave detector 8 is made equal. This is advantageous for synchronization between the signals inputted to the two input sections 5.

Figure 8D:
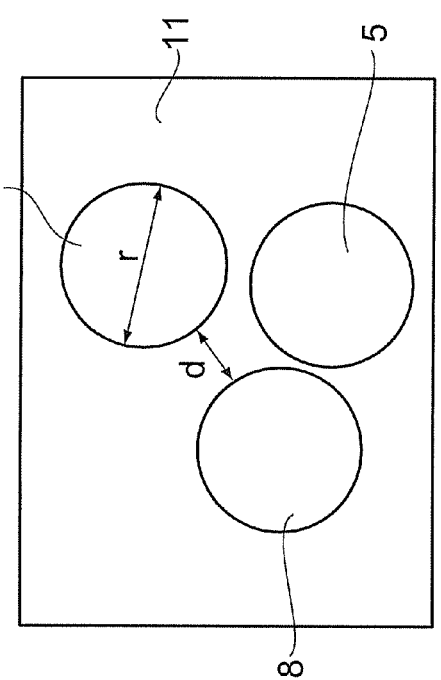

On the other hand, as shown in FIG. 8D, the diameter r of the input section 5 can be made twice or more the spacing d between the input section 5 and the wave detector 8. Then, the wavelength of the spin wave excited in the input section 5 can be made longer than the spacing d. Thus, even if the spacing d between the input section 5 and the wave detector 8 is different for the two input sections 5, the phase difference between the spin waves reaching the wave detector 8 may be reduced.

As described above, the contact interface at which the input section 5 and the continuous film 11 are electrically connected is preferably smaller than a circle having a diameter of 200 nm. Hence, for instance, in the case where the input section 5 is entirely in contact with the continuous film, the diameter r of the input section is preferably set to 200 nm or less. On the other hand, the size of the wave detector 8 can be designed irrespective of the size of the input section 5. Here, in order to maintain the detected spin wave at a uniform phase and to prevent attenuation of the output signal, the contact interface with the continuous film 11 is preferably made smaller. However, if the wave detector 8 is made too small, the current density increases at the contact interface with the continuous film 11. Then, a large spin torque may occur during the detection operation and excite an unintended spin wave. Thus, to the extent of not exciting an unintended spin wave, the contact interface of the wave detector 8 is preferably made smaller. Preferably, the size of the wave detector 8 is at least smaller than the wavelength of the detected spin wave. Since the half wavelength of the spin wave is almost the same as the diameter of the input section 5, the size of the detector 8 is preferably smaller than twice the diameter of the input section.

FIGS. 9A to 9D are timing charts showing the relationship between the signals A(0), B(0) inputted to the computing unit 1 or 2 and the output signal X(0). With time taken on the horizontal axis, the waveform of each signal is schematically shown. For instance, in the case where "1" is inputted, a pulse-like waveform is shown at the timing of input. In the case of "0", the signal waveform is flat, and no pulse-like waveform is shown. (In the following, timing charts are shown likewise.)

In accordance with the waveform of the input signals A(0), B(0), for a period in which the signal value corresponds to "1", a voltage V1 is applied to the input section 5, or a current I1 is passed from the input section 5 to the continuous film 11. On the other hand, when the signal value is "0", a voltage V0 is applied, or a current I0 is passed. For instance, setting V0=0 or I0=0 in the case of the signal value "0" is preferable, because this facilitates distinction from the case of the signal value "1".

In FIG. 9A, the input signals A(0) and B(0) are each "1". Hence, the voltage V1 is applied to the input section 5 at a prescribed timing for a fixed time. For instance, in the computing units shown in FIG. 8A, 8B, or 8C, the spacing d between the input section 5 and the wave detector 8 is equal for the two input sections 5. In this case, the timing for applying the voltage V1 to the input section 5 for input of the signal A(0) and the input section 5 for input of the signal B(0) is preferably set so that the phases of the excited spin waves are shifted by a half wavelength. For instance, as shown in FIG. 9A, the timing for applying the voltage V1 to the input section 5 for input of the signal B(0) is set to be delayed by the time calculated by Equation (3):

$$tr=(2f)^{-1} \quad (3)$$

where f is the frequency of the spin wave.

Thus, when the spin waves generated in the two input sections 5 reach the wave detector 8, their phases are shifted by a half wavelength. As a result, the amplitude of the composite wave of the two spin waves is attenuated, and decreases the resistance change detected in the wave detector 8. This decreases the voltage signal outputted from the terminal 9a shown in FIG. 6, for instance. Thus, the output signal X0 from the computing unit becomes "0".

In FIG. 9B, the signal A(0) is "0", and the signal B(0) is "1". Hence, the input section 5 for input of the signal A(0) is applied with no voltage, and the input section 5 for input of the signal B(0) is applied with the voltage V1. In this case, no spin wave is excited in the input section 5 to which the signal A(0) has been inputted, but a spin wave is excited only in the input section 5 to which the signal B(0) has been inputted. Hence, no interference of spin waves occurs. Thus, the wave detector 8 detects the spin wave excited in response to the input of the signal B(0). Hence, the output signal X(0) becomes "1".

In FIG. 9C, the signal A(0) is "1", and the signal B(0) is "0". Also in this case, a spin wave is excited only in the input section 5 for input of the signal A(0), and the output signal X(0) becomes "1". In FIG. 9D, the signals A(0) and B(0) are both "0". Thus, no spin wave is excited, and the output signal X(0) also becomes "0".

FIGS. 10A to 10D are alternative timing charts showing the relationship between the signals A(0), B(0) inputted to the computing unit 1 or 2 and the output X(0).

In the spin wave-based computation, the duration of applying the voltage V1 or passing the current I1 to the input section 5 can be set arbitrarily to some extent. For instance, as shown in FIGS. 10A to 10D, in accordance with each waveform of the signals A(0) and B(0), the time from application (turn-on) to turn-off of the voltage V1 can be prolonged.

In FIG. 10A, the signals A(0) and B(0) are both "1". The timing of application of the voltage V1 to the input section 5 for input of the signal A(0) and the timing of application of the voltage V1 to the input section 5 for input of the signal B(0) are shifted by tr. Furthermore, the durations tA and tB of application of the voltage V1 are made equal. Thus, the spin waves are attenuated by interference, and the output signal X(0) becomes "0".

In FIG. 10B, the signal A(0) is "0", and the signal B(0) is "1". The duration of application of the voltage V1 to the input section 5 for input of the signal B(0) is tB. In this case, as shown in FIG. 10B, the voltage V1 may be turned off after the wave detector 8 starts to detect the output signal X(0).

In FIG. 10C, the signal A(0) is "1", and the signal B(0) is "0". Again, the duration of application of the voltage V1 to the input section 5 for input of the signal A(0) is tA, and the voltage V1 may be turned off after the wave detector 8 starts to detect the output signal X(0). In FIG. 10D, the signals A(0) and B(0) are both "0". Thus, no spin wave is excited, and the output signal X(0) also becomes "0".

As shown in FIGS. 9A to 9D, by applying V1 with a pulse voltage of short duration, the power consumption can be suppressed. As shown in FIGS. 10A to 10D, by applying a voltage V1 of long duration, the duration of the wave is prolonged. This can improve the stability of the detection. This also applies to the case of passing the current I1 to the input section 5 in response to the signals A(0), B(0).

Figure 11:
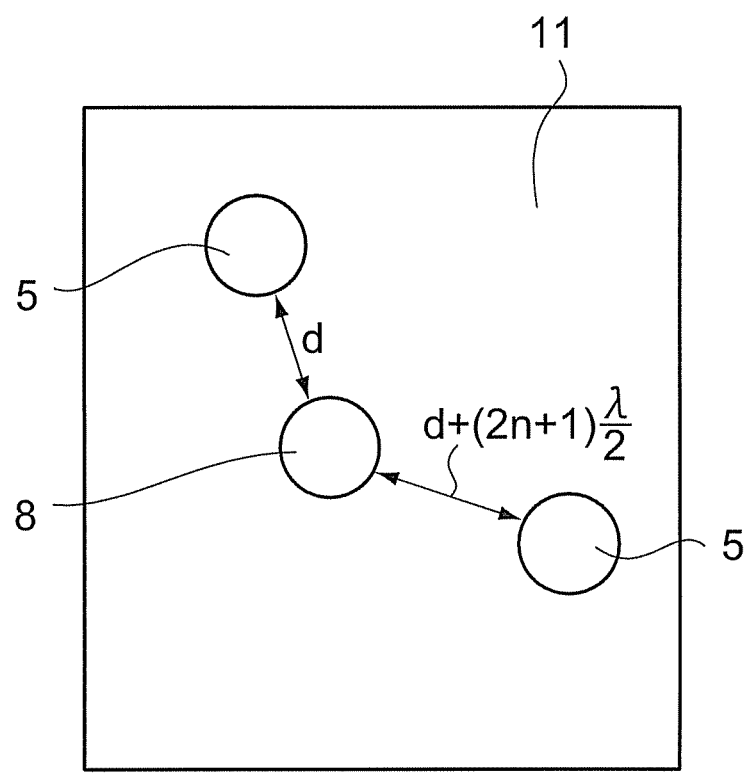
FIG. 11 is a plan view schematically illustrating an alternative example of the computing units 1 and 2 according to the first embodiment.

FIG. 11 is a plan view schematically showing an alternative arrangement example of two input sections 5 and a wave detector 8 in the computing units 1 and 2.

In the computing unit shown in FIG. 11, one of the spacings between the two input sections 5 and the wave detector 8 is made wider than the other by a half odd multiple of the wavelength λ of the spin wave. In FIG. 11, n represents an integer.

FIGS. 12A to 12D are timing charts showing the relationship between the signals A(0), B(0) inputted to the computing unit shown in FIG. 11 and the output X(0).

In FIG. 12A, the input signals A(0) and B(0) are both "1". Thus, the input section 5 for input of the signal A(0) and the input section 5 for input of the signal B(0) are simultaneously applied with the voltage V1. One of the spacings between the two input sections 5 and the wave detector 8 is longer than the other by a half odd multiple of the wavelength λ of the spin wave. Hence, two spin waves excited in the respective input sections 5 are out of phase by a half wavelength at the time of reaching the wave detector 8. Thus, the amplitude of the composite wave of the two spin waves is attenuated, and decreases the outputted voltage signal. Hence, as shown in FIG. 12A, the output signal X(0) becomes "0".

In FIGS. 12B and 12C, one of the signals A(0) and B(0) is "0", and the other is "1". Hence, a spin wave is excited only in one of the two input sections 5, and no interference occurs. The wave detector 8 detects the spin wave excited in one of the input sections 5, and the output signal X(0) becomes "1". In FIG. 12D, the signals A(0) and B(0) are both "0". Thus, no spin wave is excited, and the output signal X(0) also becomes "0".

(Example of the Threshold Wave Computing Unit)

Figure 13A:
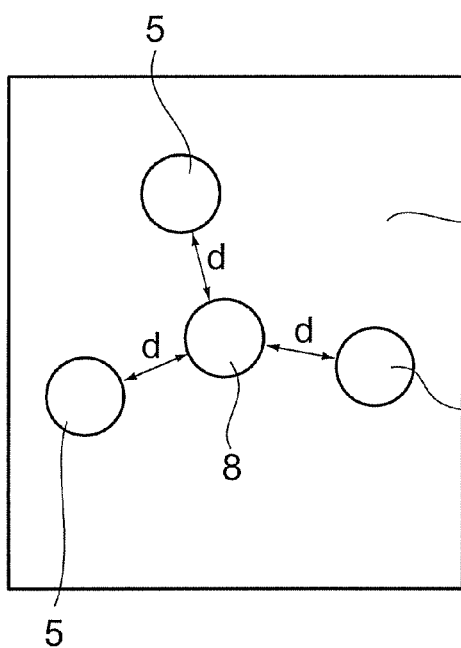
FIGS. 13A and 13B are schematic views illustrating examples of a computing unit 3 according to the first embodiment.
Figure 13B:
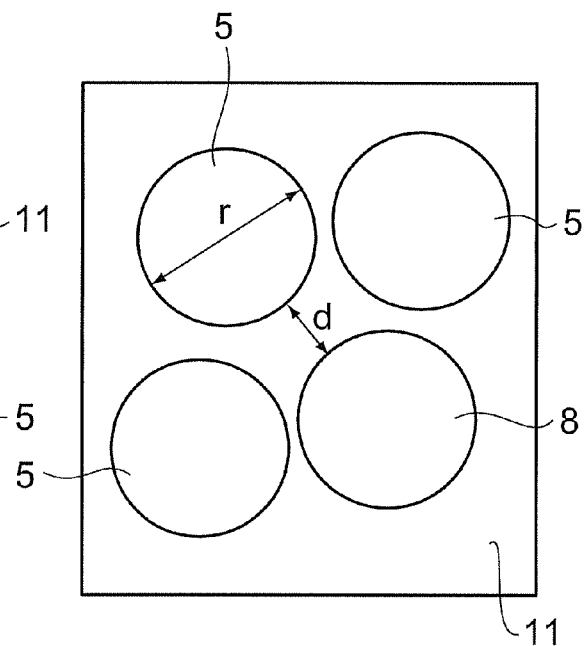

FIGS. 13A and 13B are schematic views showing arrangement examples of three input sections 5 and a wave detector 8 in the computing unit 3. The computing unit 3 is a threshold wave computing unit. The cross-sectional structure of the input section 5, the wave detector 8, and the continuous film 11 can be the same as that in the computing unit 1 or 2 serving as the wave computing unit.

In the example shown in FIG. 13A, the spacings d between the three input sections 5 and the wave detector 8 are equal. Hence, three spin waves excited by the voltage or current simultaneously inputted to the three input sections 5 simultaneously reach the wave detector 8 without phase difference. As a result, the wave detector 8 detects a composite wave having amplitude equal to the sum of the amplitudes of the spin waves.

Thus, for instance, the terminal 9a (see FIG. 6) connected to the wave detector 8 outputs a voltage signal with the magnitude corresponding to the number of spin waves having reached the wave detector 8. This voltage signal can be compared with a prescribed threshold voltage to realize the function of a threshold computing unit for e.g. outputting "1" if the number of spin waves, or signals "1", is equal to or larger than a prescribed number, and outputting "0" if the number falls below the prescribed number. Specifically, a threshold voltage is inputted to the REF terminal of the comparator 23 of FIG. 6 to cause it to output the result of comparison with the signal voltage.

In the example shown in FIG. 13B, the diameter r of the three input sections 5 is made relatively large so that the wavelength of the excited spin wave becomes longer than the spacing d between the input section 5 and the wave detector 8. That is, the spacing d can be made smaller than twice the diameter r. This can decrease the phase difference occurring when the spin waves simultaneously excited in the three input sections 5 reach the wave detector 8. As a result, the magnitude of the amplitude of the composite wave detected in the wave detector 8 corresponds to the number of spin waves excited in the three input sections 5. This enables the function of a threshold computing unit.

FIGS. 14A to 15D are timing charts showing the relationship between the signals A(0), B(0), C(−1) inputted to the computing unit 3 and the output C(0). The computing unit 3 is a threshold computing unit. The computing unit 3 outputs "1" as the output C(0) if the number of signals "1" inputted is two or more, and outputs "0" as the output C(0) if the number of signals "1" inputted is one or less.

In FIG. 14A, the input signals A(0), B(0), and C(−1) are all "1". Thus, the input section 5 for input of the signal A(0), the input section 5 for input of the signal B(0), and the input section 5 for input of the signal C(−1) are simultaneously applied with the voltage V1. For instance, in the case of the computing unit according to the arrangement example of FIG. 13A, three spin waves excited in the respective input sections 5 reach the wave detector 8 and are combined. The wave detector 8 detects a composite wave having amplitude of three times that of the spin wave excited in the input section 5. Thus, "1" is outputted as the output C(0).

In FIGS. 14B, 14C, and 14D, two of the input signals A(0), B(0), and C(−1) are "1", and the remaining one signal is "0". Hence, a spin wave is excited in two of the three input sections 5. The wave detector 8 detects a composite wave of two spin waves, and "1" is outputted as the output C(0).

In FIGS. 15A, 15B, and 15C, one of the input signals A(0), B(0), and C(−1) is "1", and the remaining two signals are "0". Hence, a spin wave is excited in one of the three input sections 5. The wave detector 8 detects the excited spin wave. However, the outputted voltage signal is lower than the threshold voltage. Hence, "0" is outputted as the output C(0). In FIG. 15D, the signals A(0), B(0), and C(−1) are all "0". Thus, no spin wave is excited, and the output C(0) also outputs "0".

(Variation 1)

FIGS. 16A to 16D are partial sectional views schematically showing the input section 5 and the continuous film of a computing unit according to a variation of the first embodiment. In the configuration of the computing unit according to this variation, a section for imparting an external magnetic field, such as a permanent magnet or wiring magnet, is provided around the continuous film 11 so as to act on the magnetization of the magnetic layer 13.

The configuration of the external magnetic field acting on the magnetization of the magnetic layer 13 can be configured so that the magnetization direction M2 due to spin torque generated by the signal of the voltage or current applied to the input section 5 competes with the magnetization direction H0 due to the external magnetic field. Then, a stable oscillation state of the spin wave can be obtained, and the spin wave can be efficiently generated. For instance, in the configuration shown in FIGS. 16A and 16B, the magnetization direction M1 of the magnetic layer 15 magnetized parallel to the surface of the continuous film 11 is opposite to the direction H0 of the external magnetic field. The angle therebetween is close to 180 degrees. In this case, a current J1 passed from the input section 5 via the magnetic layer 13 toward the magnetic layer 15 causes an action of spin torque for magnetizing the magnetic layer 13 in the same direction M1 as the magnetic layer 15. On the other hand, the external magnetic field has the action of causing magnetization in the direction H0 opposite to the magnetic layer 15. As a result, these actions compete with each other and can easily excite a spin wave.

Figure 16A:
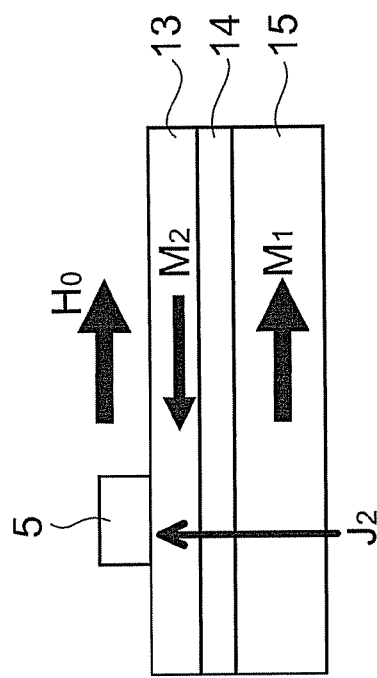
FIGS. 16A to 16D are schematic views illustrating partial cross-sections including an input section in a computing unit according to a variation of the first embodiment.
Figure 16B:
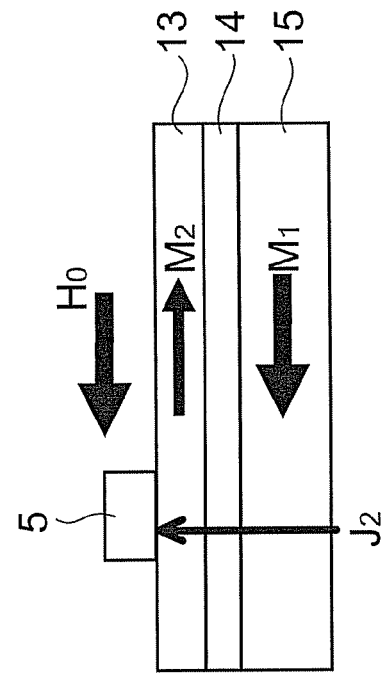
Figure 16C:
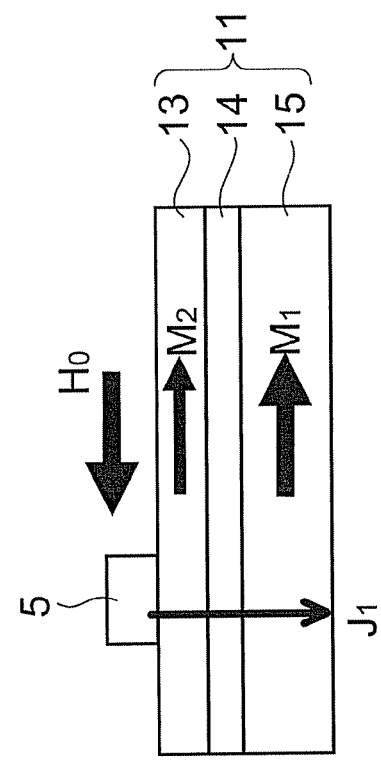
Figure 16D:
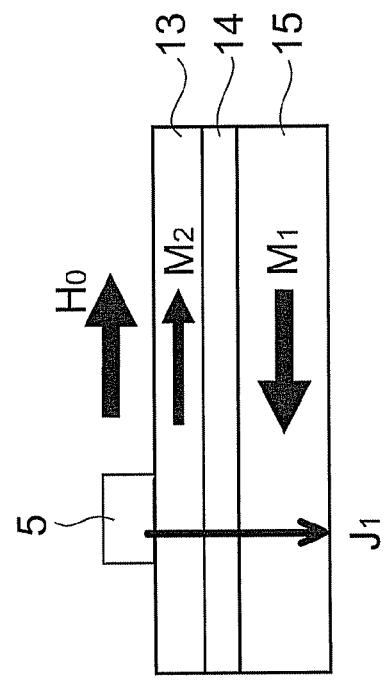

On the other hand, in the configuration shown in FIGS. 16C and 16D, the direction H0 of the external magnetic field is matched with the magnetization direction M1 of the magnetic layer 15. In this case, a current J2 passed from the magnetic layer 15 via the magnetic layer 13 toward the input section 5 causes an action of spin torque for magnetizing the magnetic layer 13 in the direction M2 opposite to the magnetization direction M1 of the magnetic layer 15. As a result, the action of the external magnetic field competes with the action of spin torque. This can facilitate excitation of a spin wave.

Figure 17:
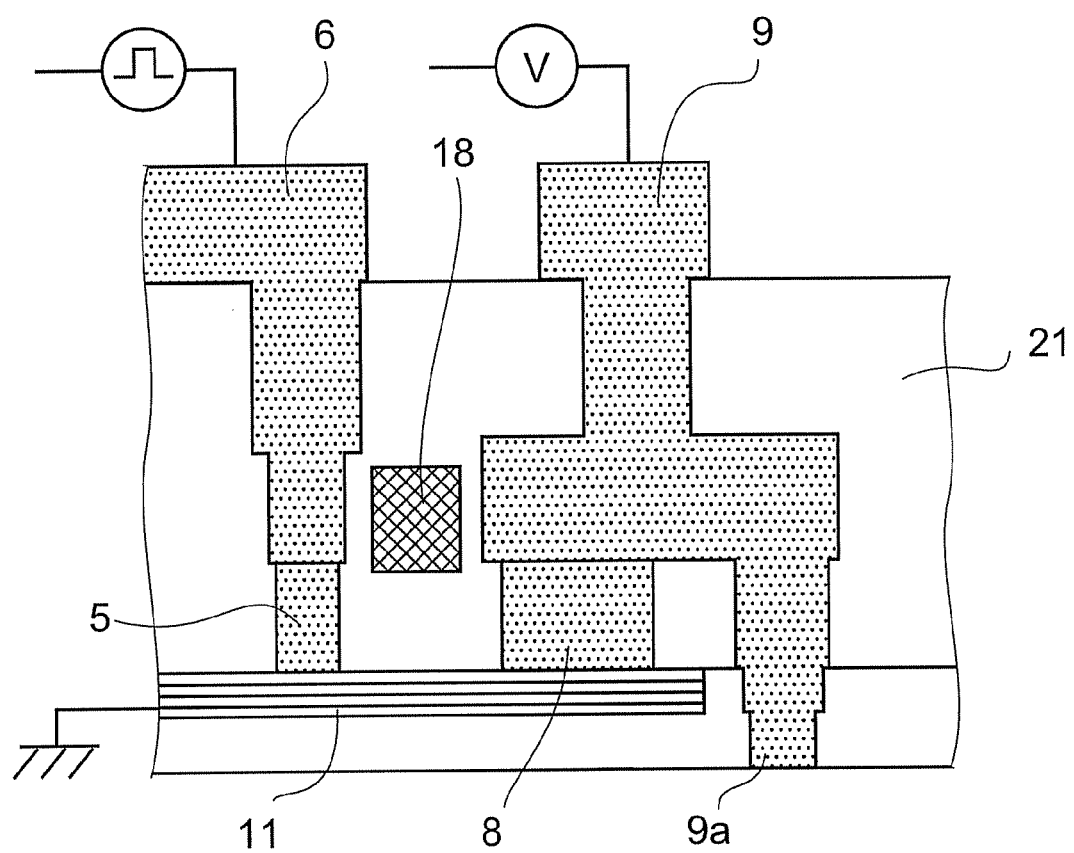
FIG. 17 is a schematic cross-sectional view illustrating the computing unit according to the variation of the first embodiment.

FIG. 17 is a schematic view showing a cross section of the computing unit according to this variation equipped with an external magnetic field imparting section 18.

On a substrate, not shown, a continuous film 11 is provided via an insulating film 21. An input section 5 and a wave detector 8 are connected to the surface of the continuous film 11. The input section 5 is connected to an input electrode 6, and the wave detector 8 is connected to an output electrode 9. Furthermore, an external magnetic field imparting section 18 is provided above the continuous film 11 via the insulating film 21. The external magnetic field imparting section 18 may be a permanent magnet. Alternatively, the external magnetic field imparting section 18 may be formed as a metal wiring extending in the depth direction of the figure so that the magnetic field generated by passing a current in the metal wiring acts on the continuous film 11.

(Variation 2)

Figure 18A:
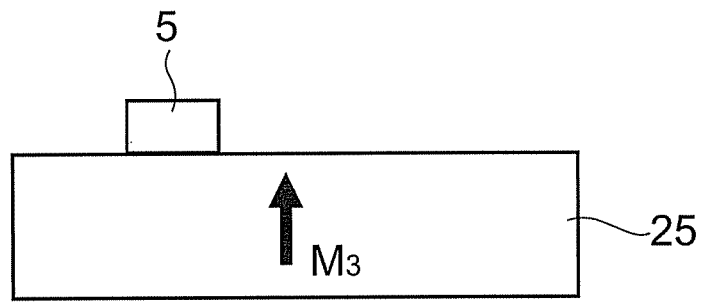
FIGS. 18A to 18C are schematic views illustrating partial cross-sections including an input section in a computing unit according to a second variation of the first embodiment.
Figure 18B:
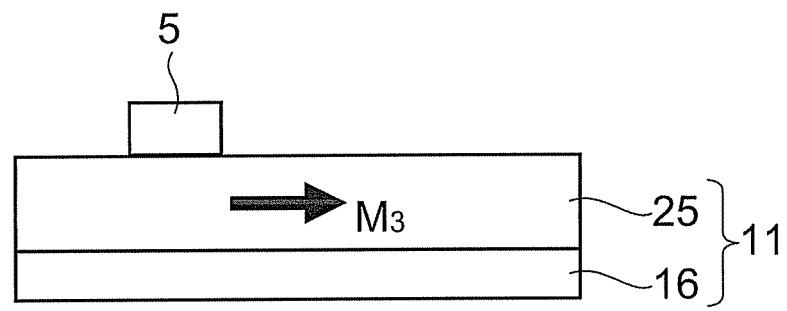
Figure 18C:
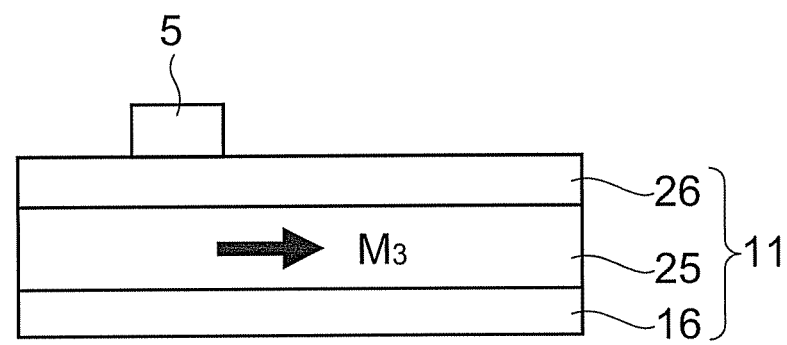

FIGS. 18A to 18C are partial sectional views schematically showing the input section 5 and the continuous film 11 of a computing unit according to a second variation of the first embodiment. In this variation, the number of magnetic layers included in the continuous film 11 is one.

In FIG. 18A, a magnetic layer 25 is formed on a substrate not shown. An input section 5 formed from a non-magnetic conductive material is connected to the magnetic layer 25. The continuous film 11 is the magnetic layer 25 itself. The magnetization direction M3 of the magnetic layer 25 is made perpendicular to the surface of the magnetic layer 25.

Thus, even in the case of one magnetic layer, portions having different magnetic anisotropy are locally induced due to the forming of the input section 5. Hence, by applying a voltage to the input section 5 or passing a current in the magnetic layer 25 via the input section 5, spin torque occurs and excites a spin wave. Furthermore, because the magnetization direction M3 is perpendicular to the surface of the magnetic layer 25, the spin wave has the isotropic propagation characteristic in the magnetic layer 25.

Alternatively, as shown in FIG. 18B, the magnetization direction M3 of the magnetic layer 25 can be made parallel to the surface of the magnetic layer 25. In this case, preferably, an antiferromagnetic layer 16 is provided on the side opposite to the surface provided with the input section 5 to pin the magnetization direction M3 in the magnetic layer 25. This can prevent generation of a spin wave in the continuous film 25 due to factors other than the input signal. Thus, it is also advantageous that the magnetic layer can be easily manufactured with the magnetization direction parallel to the surface.

Furthermore, on the surface of the magnetic layer 25, a conductive protective film, not shown, may be formed as a cap layer. Alternatively, as shown in FIG. 18C, an insulating layer 26 may be provided between the magnetic layer 25 and the input section 5.

Figure 19A:
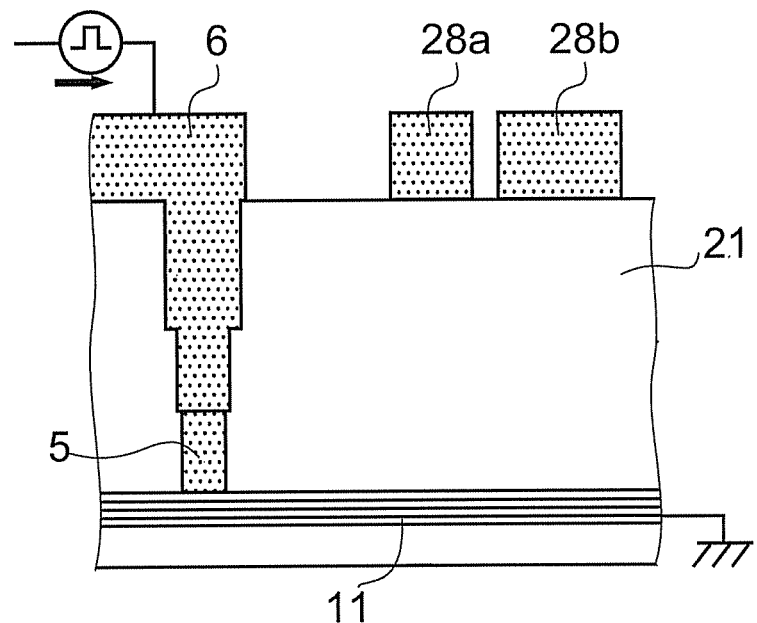
FIG. 19A is a schematic cross-sectional view and FIG. 19B is a schematic plan view respectively, illustrating the computing unit according to the second variation of the first embodiment.
Figure 19B:
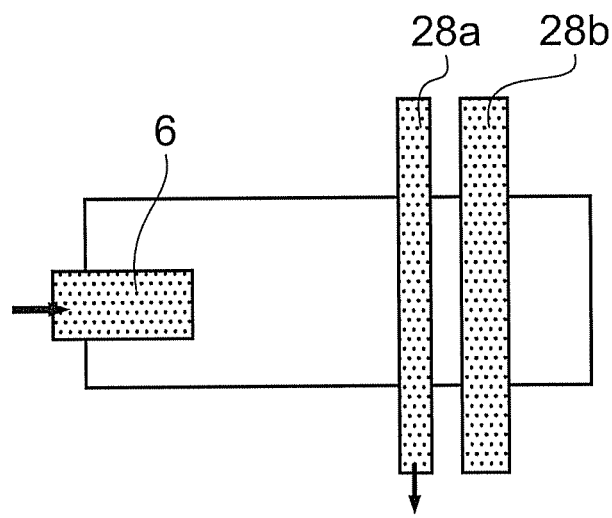

FIGS. 19A and 19B are schematic views showing a cross section (FIG. 19A) and a plan view (FIG. 19B) of the computing unit according to the second variation. As shown in FIG. 19A, the computing unit according to this variation includes an input section 5 connected to the continuous film 11, an input electrode 6, and a wave detector 28 provided via an insulating film 21.

As shown in FIG. 19B, the wave detector 28 is made of coplanar lines 28a and 28b formed in parallel. The wave detector 28 detects the change of the magnetic field due to the spin wave propagated in the continuous film 11 by the electromagnetic induction effect. More specifically, the spin wave excited in the input section 5 by the signal inputted from the input electrode 6 is propagated in the continuous film 11. The wave detector 28 can detect and output the change of the magnetic field due to the spin wave as a radio frequency induced current. Here, instead of the coplanar lines, various waveguides such as microstrip lines can be used.

(Variation 3)

Figure 20A:
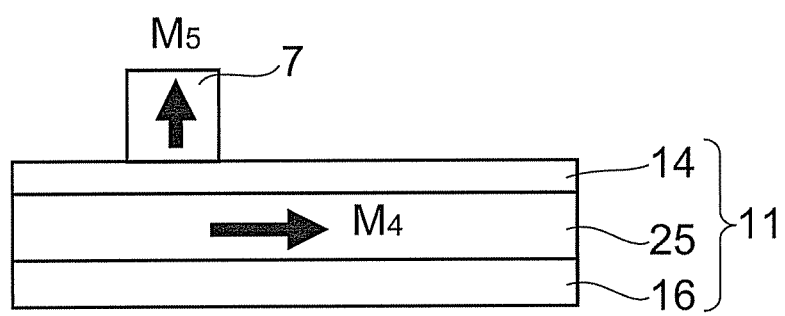
FIGS. 20A and 20B are schematic views illustrating partial cross-sections of a computing unit according to a third variation of the first embodiment.
Figure 20B:
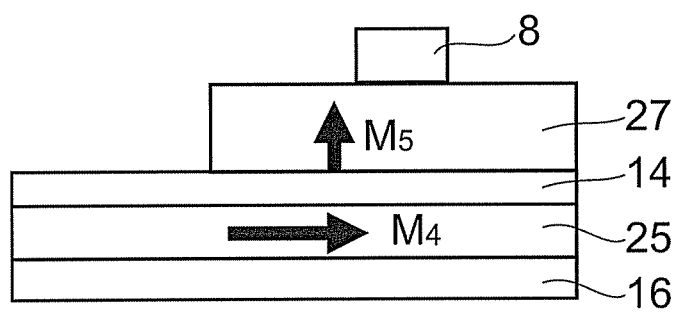

FIGS. 20A and 20B are schematic views showing a partial cross section of the input section 7 (FIG. 20A) and a partial cross section of the wave detector 8 (FIG. 20B) according to a third variation.

As shown in FIG. 20A, the input section 7 is also formed from a conductive magnetic body. Furthermore, a spacer layer 14 is provided between the input section 7 and the magnetic layer 25. Also in such a structure, a spin wave can be excited by applying a voltage to the input section 7 or passing a current in the magnetic layer 25 from the input section 7 via the spacer layer 14. Here, in order to excite a spin wave with lower energy, the magnetization direction M5 of the input section 7 and the magnetization direction M4 of the magnetic layer 25 are preferably orthogonal.

On the other hand, the wave detector for detecting the spin wave propagated in the magnetic layer 25 can be made of coplanar lines 28a and 28b shown in FIG. 19B. Furthermore, as shown in FIG. 20B, the wave detector 8 can be provided on the surface of a layer structure in which the magnetic layer 25, the spacer layer 14, and a magnetic layer 27 are stacked. By the configuration shown in FIG. 20B, the spin wave can be detected using the TMR effect or GMR effect.

(Variation 4)

Figure 21:
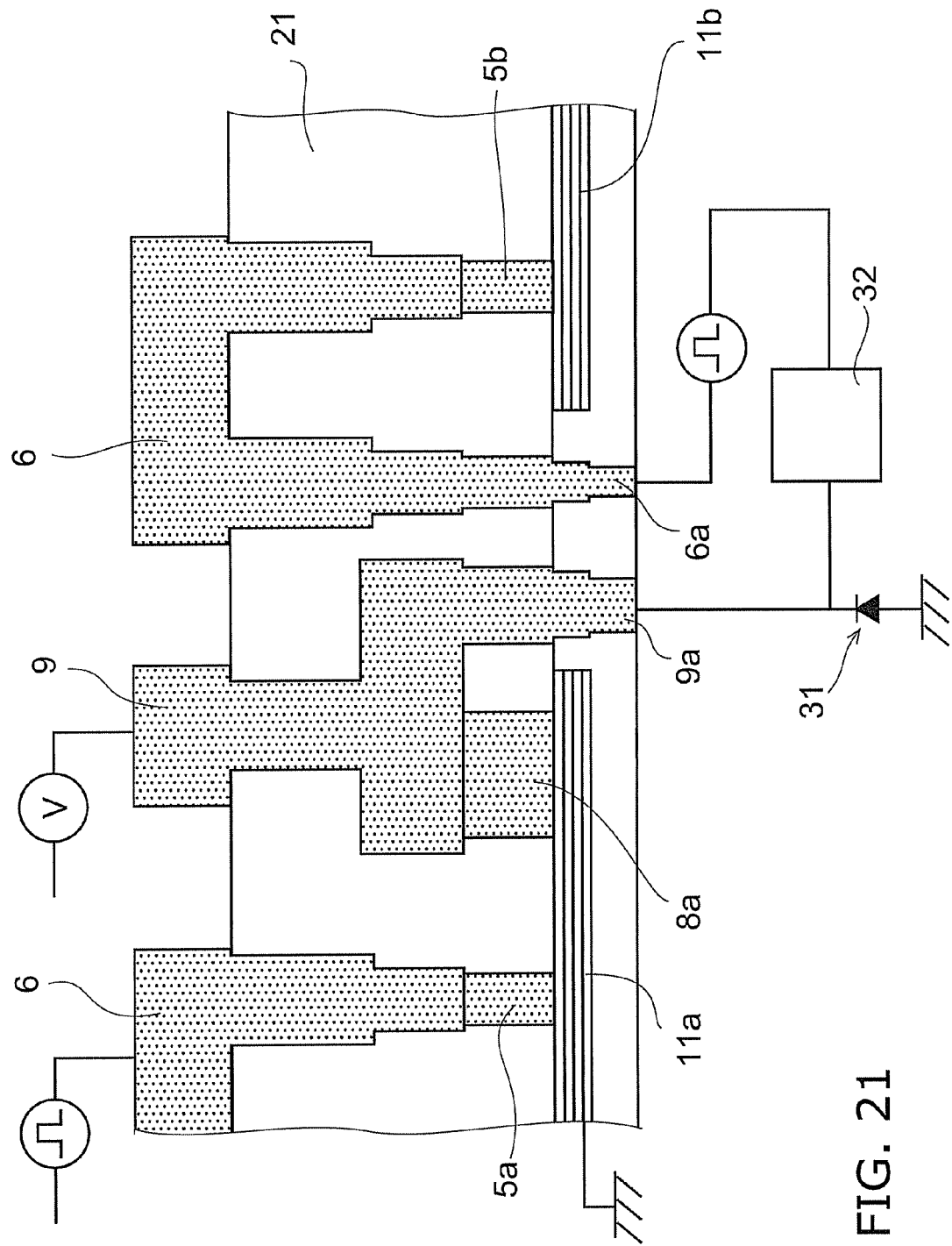
FIG. 21 is a schematic view illustrating a partial cross section of a computing units 1 and 2 according to a fourth variation of the first embodiment

FIG. 21 is a schematic view showing a partial cross section of the computing units 1 and 2 according to a fourth variation.

In this variation, the voltage signal outputted from the terminal 9a of the computing unit 1 is inputted to the input terminal 6a of the computing unit 2 via a low pass filter 32. Furthermore, a diode 31 for rectification is placed between the terminal 9a and the low pass filter 32. Thus, the voltage signal outputted from the computing unit 1 can be converted to a unipolar signal and inputted to the computing unit 2. Here, depending on the waveform of the electrical signal outputted from the computing unit 1, it is possible to provide an embodiment without the low pass filter 32.

(Variation 5)

Figure 22:
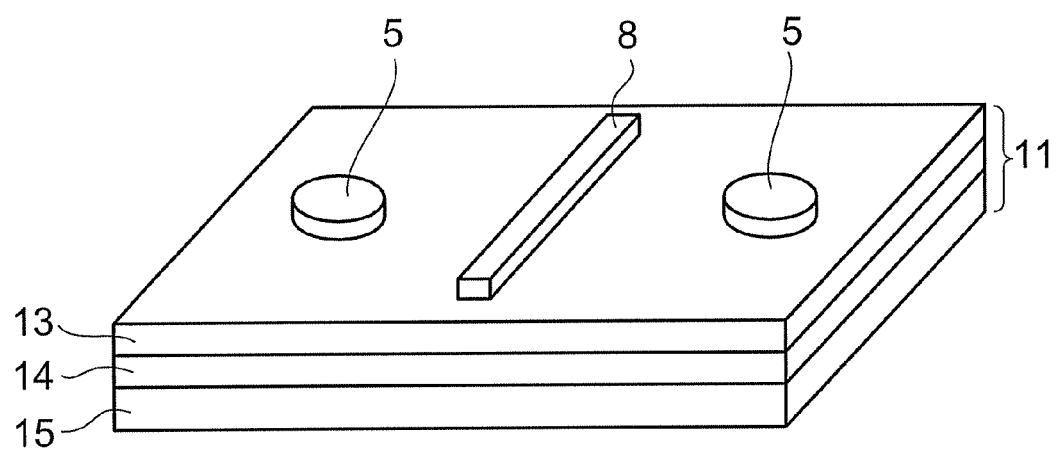
FIG. 22 is a perspective view schematically illustrating a computing unit according to a fifth variation.

FIG. 22 is a perspective view schematically showing a computing unit according to a fifth variation. Also in the computing unit according to this variation, two input sections 5 and a wave detector 8 made of a non-magnetic conductive material are provided on a continuous film 11. The continuous film 11 is configured in a layer structure of a magnetic layer 13, a spacer layer 14, and a magnetic layer 15 from the surface. The wave detector 8 in this variation is provided as a wiring made of a non-magnetic conductive material as shown in FIG. 22.

If a spin wave is excited in the magnetic layer 13, a spin current corresponding to the magnitude of its amplitude flows into the wiring provided as the wave detector 8. Then, in the wiring made of a non-magnetic body, by the effect of spin-orbit interaction, a current corresponding to the magnitude of the spin current flows in the wiring. Such a phenomenon is called the inverse spin Hall effect. As a result, the magnitude of the amplitude of the spin wave can be converted to the magnitude of the current flowing in the wiring and detected.

Here, in order to increase the detection sensitivity, the non-magnetic conductive material used for the wiring is preferably a material containing substances with high spin-orbit interaction. Specifically, substances having an atomic number of 37 or more are preferable because of high spin-orbit interaction. For instance, platinum Pt, gold Au, or an alloy containing one of them can be used.

The computing unit shown in FIG. 22 is a wave computing unit having the configuration of the computing unit 1 or 2. Here, the wave computing unit 8 according to this example can be used also for the threshold wave computing unit having the configuration of the computing unit 3.

(Variation 6)

Figures 23A, 23B:
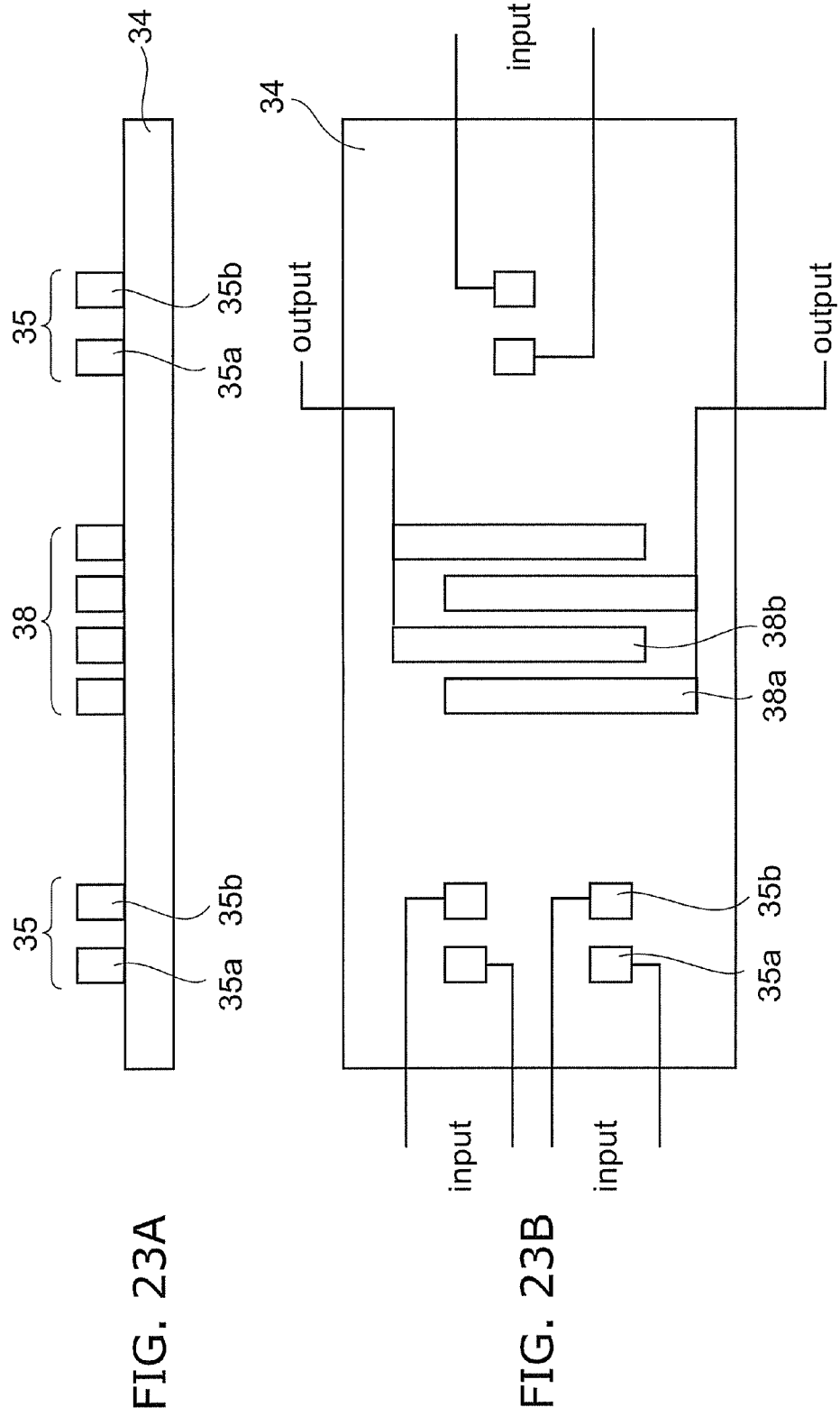
FIGS. 23A and 23B are schematic views illustrating a computing unit 3 according to a sixth variation.

FIGS. 23A and 23B are schematic views showing a computing unit 3 according to a sixth variation. FIG. 23A shows a front view, and FIG. 23B shows a plan view. In this variation, a continuous film 34 is provided on a substrate, not shown. Three input sections 35 and a wave detector 38 are provided on the continuous film 34. The continuous film 34 includes a surface layer made of a piezoelectric body.

The input section 35 includes an electrode pair composed of a first electrode 35a and a second electrode 35b. A pulse voltage or alternating voltage corresponding to the input signal is applied between the first electrode 35a and the second electrode 35b. Then, the surface of the piezoelectric body is strained to generate a surface acoustic (elastic) wave. The surface acoustic wave has a wavelength corresponding to the spacing between the first electrode 35a and the second electrode 35b. The surface acoustic wave is propagated along the surface of the continuous film 34.

Here, the propagation characteristic of the surface acoustic wave depends on the crystallinity of the piezoelectric body. The surface acoustic wave is propagated in a direction corresponding to the crystal orientation. In particular, in a single crystal piezoelectric body, a uniform surface acoustic wave is excited. Hence, the continuous film 34 or the surface layer of the continuous film 34 is preferably formed from a single crystal piezoelectric body.

Furthermore, in order to equalize the wavelength of the surface acoustic wave excited in each input section 35, for instance, it is preferable that the same electrode shape be used in the input sections 35 with an equal spacing between the first electrode 35a and the second electrode 35b.

On the other hand, as shown in FIG. 23B, the wave detector 38 provided on the continuous film 34 is configured so that two electrodes 38a and 38b formed in a comb shape are meshed with each other. The surface acoustic waves excited in the respective input sections 35 and propagated at the surface of the continuous film 34 are combined at the position of the wave detector 38. Then, in the wave detector 38, an electrical signal corresponding to the amplitude of the composite wave can be extracted by the piezoelectric effect.

Here, preferably, the longer side of the linearly formed electrodes 38a and 38b is arranged perpendicular to the direction of the input section 35. That is, by arrangement orthogonal to the propagation direction of the surface acoustic wave directed from the input section 35 to the wave detector 38, the detection efficiency of the surface acoustic wave can be increased. Furthermore, preferably, the direction from the input section 35 toward the wave detector (the horizontal direction in FIGS. 23A and 23B) is aligned with the crystal direction maximizing the propagation speed of the surface acoustic wave.

Furthermore, the spacing between the first electrode 35a and the second electrode 35b is matched with the spacing between the comb-shaped electrodes 38a and 38b of the wave detector 38. This makes it possible to detect only the elastic wave excited in the input section 35.

In the computing unit shown in FIGS. 23A and 23B, the distance from the input sections 35 to the wave detector 38 is fixed. By aligning the timing of applying a voltage to the input sections 35, the phases of the surface acoustic waves combined at the position of the wave detector 38 can be aligned. This enables the function of a threshold wave computing unit.

Alternatively, two input sections 35 can be provided on the continuous film 34, and the distances from the respective input sections 35 to the wave detector 38 (combining position) can be shifted by a half wavelength of the surface acoustic wave. Thus, the combined surface acoustic waves can be set in opposite phase. This also enables the function of a wave computing unit for performing exclusive OR operation.

As a method for inverting the phase of the surface acoustic wave combined at the position of the wave detector 38, it is also possible to use the method of shifting the timing of applying a voltage to the input section 35 by the propagation time of a half wavelength. Alternatively, it is also possible to use the method of inverting the polarity of the voltage applied to the first electrode 35a and the second electrode 35b in one of the input sections 35.

Second Embodiment

Figure 24:
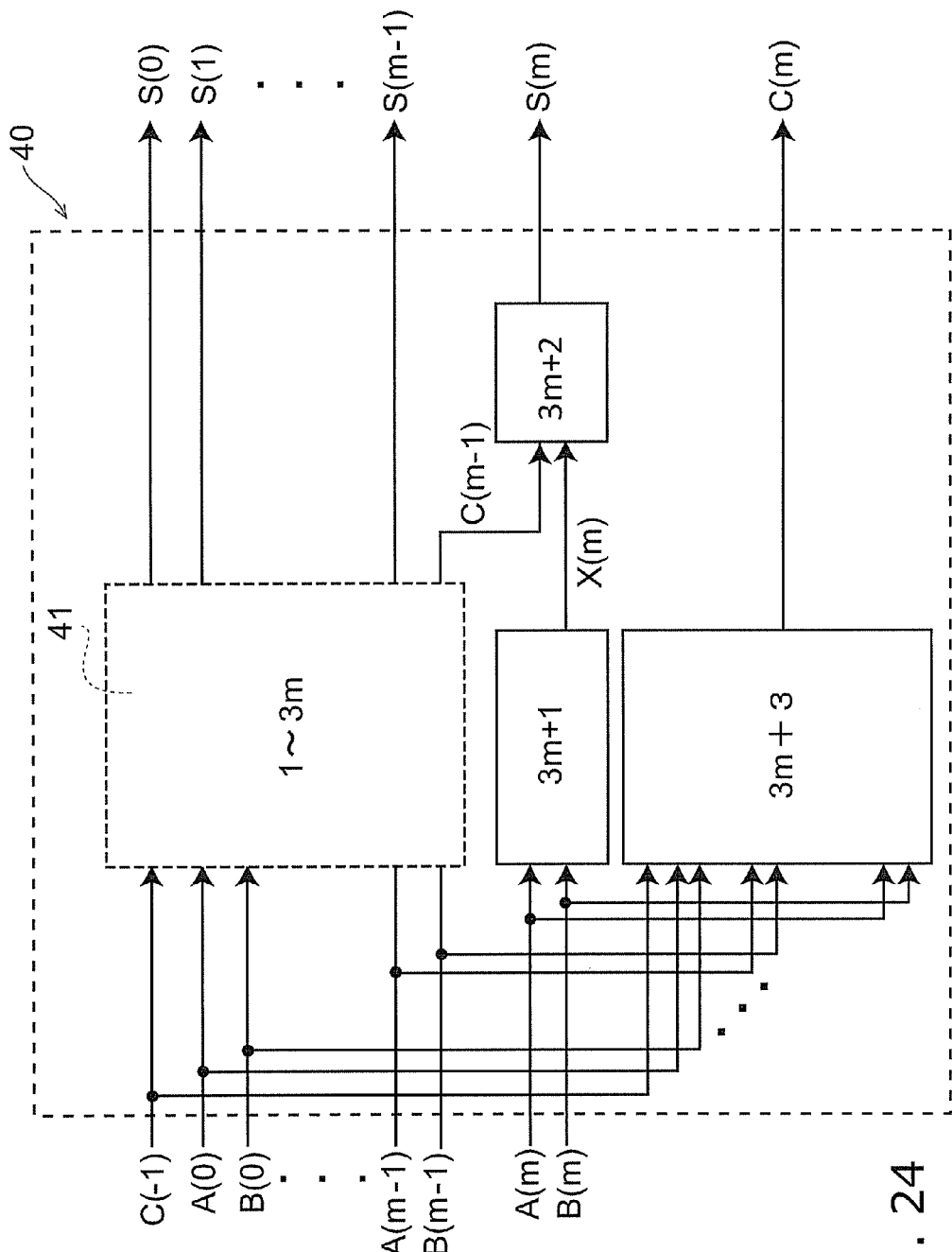
FIG. 24 is a block diagram illustrating an adder according to a second embodiment.

FIG. 24 is a block diagram showing an adder according to a second embodiment. The adder according to the embodiment is an (m+1)-bit adder 40. In response to input of signals corresponding to signals A(0) to A(m), signals B(0) to B(m), and a signal C(−1), the adder outputs computation results S(0) to S(m), and C(m). The signals A(0) to A(m) correspond to the bit values of the i-th to (i+m)-th positions of a binary value A. The signals B(0) to B(m) correspond to the bit values of the i-th to (i+m)-th positions of a binary value B. The signal C(−1) corresponds to the carry bit value from the (i−1)-th position to the i-th position for the sum of the binary value A and the binary value B. Here, m is an integer of 0 or more.

A(0) to A(m), B(0) to B(m), and C(−1) are one of the two inputs represented by "0" or "1". The input terminal of the adder receives input of an electrical signal corresponding to "0" or "1". On the other hand, the output terminal outputs a signal corresponding to S(0) to S(m), and C(m), which are likewise either "0" or "1".

As shown in FIG. 24, the (m+1)-bit adder 40 can be regarded as an adder including an m-bit adder 41, a computing unit 3m+1, a computing unit 3m+2, and a computing unit 3m+3.

Furthermore, the m-bit adder 41 includes an (m−1)-bit adder, a computing unit 3m−2, a computing unit 3m−1, and a computing unit 3m. In response to input of A(0) to A(m−1), B(0) to B(m−1), and C(−1), the m-bit adder 41 outputs S(0) to S(m−1), and C(m−1).

Moreover, the (m−1)-bit adder is regarded as an adder including an (m−2)-bit adder, a computing unit 3m−5, a computing unit 3m−4, and a computing unit 3m−3. In response to input of A(0) to A(m−2), B(0) to B(m−2), and C(−1), the (m−1)-bit adder outputs S(0) to S(m−2), and C(m−2).

On the other hand, for m=0, the adder 40 is the 1-bit adder shown in FIG. 1, and includes a computing unit 1, a computing unit 2, and a computing unit 3. In response to input of A(0), B(0), and C(−1), the adder 40 outputs S(0) and C(0).

Ultimately, the (m+1)-bit adder 40 includes computing units 1 to 3m+3. Among them, the computing unit 3k+1 is a first wave computing unit. In response to input of A(k) and B(k), the computing unit 3k+1 outputs an intermediate output X(k). Here, k is an integer of 0 to m. TABLE 5 shows the truth values of the computing unit 3k+1. The computing unit 3k+2 is a second wave computing unit. In response to input of X(k) and C(k−1), the computing unit 3k+2 outputs a computation result S(k). TABLE 6 shows the truth values of the computing unit 3k+2.

TABLE 5

| A[k] | B[k] | X[k] |
|------|------|------|
| 0 | 0 | 0 |
| 1 | 0 | 1 |
| 0 | 1 | 1 |
| 1 | 1 | 0 |

TABLE 6

| X[k] | C[k − 1] | S[k] |
|------|----------|------|
| 0 | 0 | 0 |
| 1 | 0 | 1 |
| 0 | 1 | 1 |
| 1 | 1 | 0 |

The truth table shown in TABLE 7 joins TABLES 5 and 6 and shows the computation result S(k) in response to inputs A(k), B(k), and C(k−1). As is clear from TABLE 7, the computation result S(k) does not change even if the inputs A(k), B(k), and C(k−1) are interchanged. For instance, TABLE 7 indicates that the computation result S(k) remains unchanged as described above even in the configuration in which A(k) and C(k−1) are inputted to the first wave computing unit, and X(k) and B(k) are inputted to the second wave computing unit.

TABLE 7

| A[k] | B[k] | C[k − 1] | C[k] |
|------|------|----------|------|
| 0    | 0    | 0        | 0    |
| 1    | 0    | 0        | 0    |
| 0    | 1    | 0        | 0    |
| 1    | 1    | 0        | 1    |
| 0    | 0    | 1        | 0    |
| 1    | 0    | 1        | 1    |
| 0    | 1    | 1        | 1    |
| 1    | 1    | 1        | 1    |

Furthermore, the computing unit $3k+3$ is a threshold wave computing unit. In response to input of A(0) to A(k), B(0) to B(k), and C(−1), the computing unit $3k+3$ outputs C(k). Furthermore, in accordance with Equation 1, the computing unit $3k+3$ outputs a signal corresponding to "0" or "1" with reference to a threshold corresponding to $2k+1$.

Here, each input signal is weighted. With the weight of the input signal A(0) set to 1, weighting is performed so that the weight of the input signal A(i) (i is an integer of 0 to k) is multiplied by 2i. Specifically, for instance, weighting can be performed by providing 2i input electrodes, each producing a signal A(i).

Alternatively, weighting can be performed also by applying a voltage or current to the input section so that the magnitude of the input signal A(i) is 2i times the magnitude of the input signal A(0). Thus, the magnitude of the amplitude of the excited wave is weighted. As a result, the threshold logic operation represented in Equation 1 is performed.

$$C_m = \begin{cases} 1 & \text{if } \sum_{i=0}^{m} 2^i A_i + \sum_{i=0}^{m} 2^i B_i + C_{-1} \geq 2^{m+1} \\ 0 & \text{if } \sum_{i=0}^{m} 2^i A_i + \sum_{i=0}^{m} 2^i B_i + C_{-1} \leq 2^{m+1} - 1 \end{cases} \quad \text{[Equation 1]}$$

The first wave computing unit, the second wave computing unit, and the threshold wave computing unit can be configured similarly to the wave computing unit and the threshold wave computing unit, respectively, described in the first embodiment.

Figure 25:
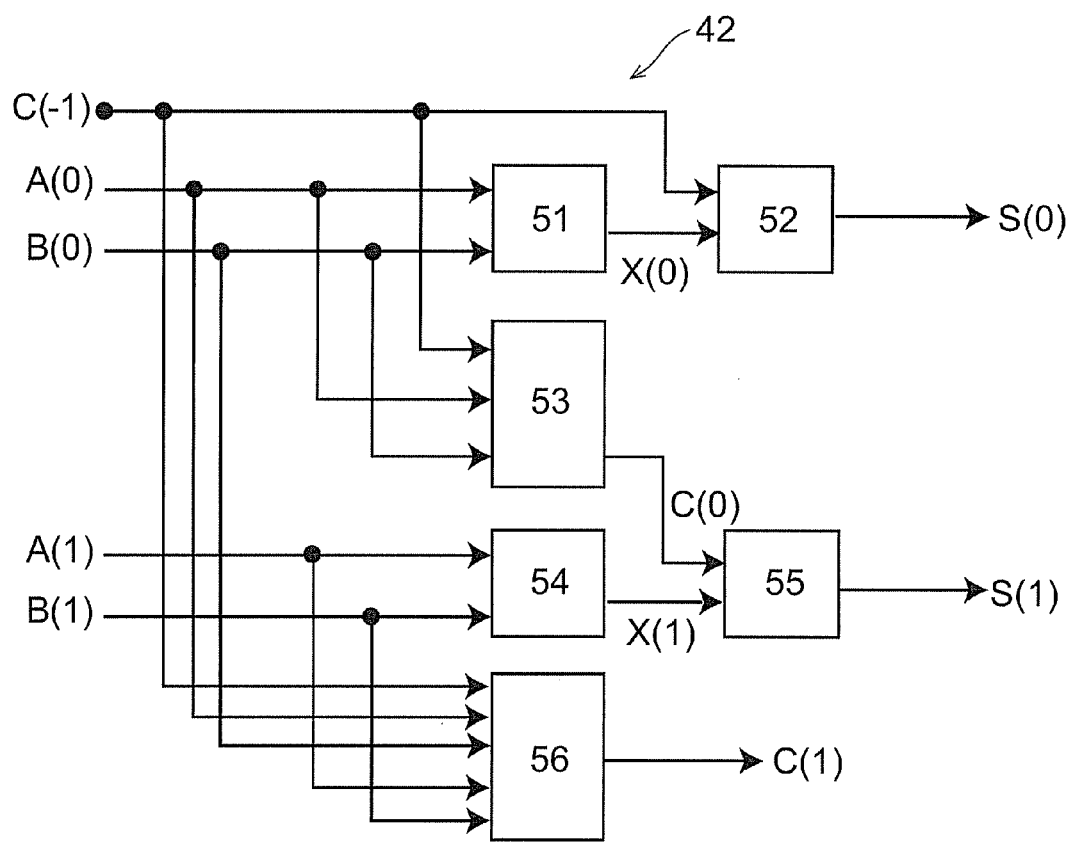
FIG. 25 is a block diagram illustrating a 2-bit adder according to the second embodiment.

FIG. 25 is a block diagram showing a 2-bit adder 42 for m=1. The 2-bit adder 42 includes computing units 51 to 56. In response to input of A(0), B(0), A(1), B(1), and C(−1), the 2-bit adder 42 outputs S(0), S(1), and C(1). The computing unit 51 and the computing unit 54 are first wave computing units, and output intermediate outputs X(0) and X(1), respectively. The computing unit 52 and the computing unit 55 are second wave computing units. In response to input of X(0) and C(−1), and X(1) and C(0), the computing unit 52 and the computing unit 55 output S(0) and S(1). Furthermore, the computing units 53 and 56 are threshold wave computing units. In response to input of A(0), B(0), and C(−1), the computing unit 53 outputs C(0). In response to input of A(0), B(0), A(1), B(1), and C(−1), the computing unit 56 outputs C(1).

Figure 26:
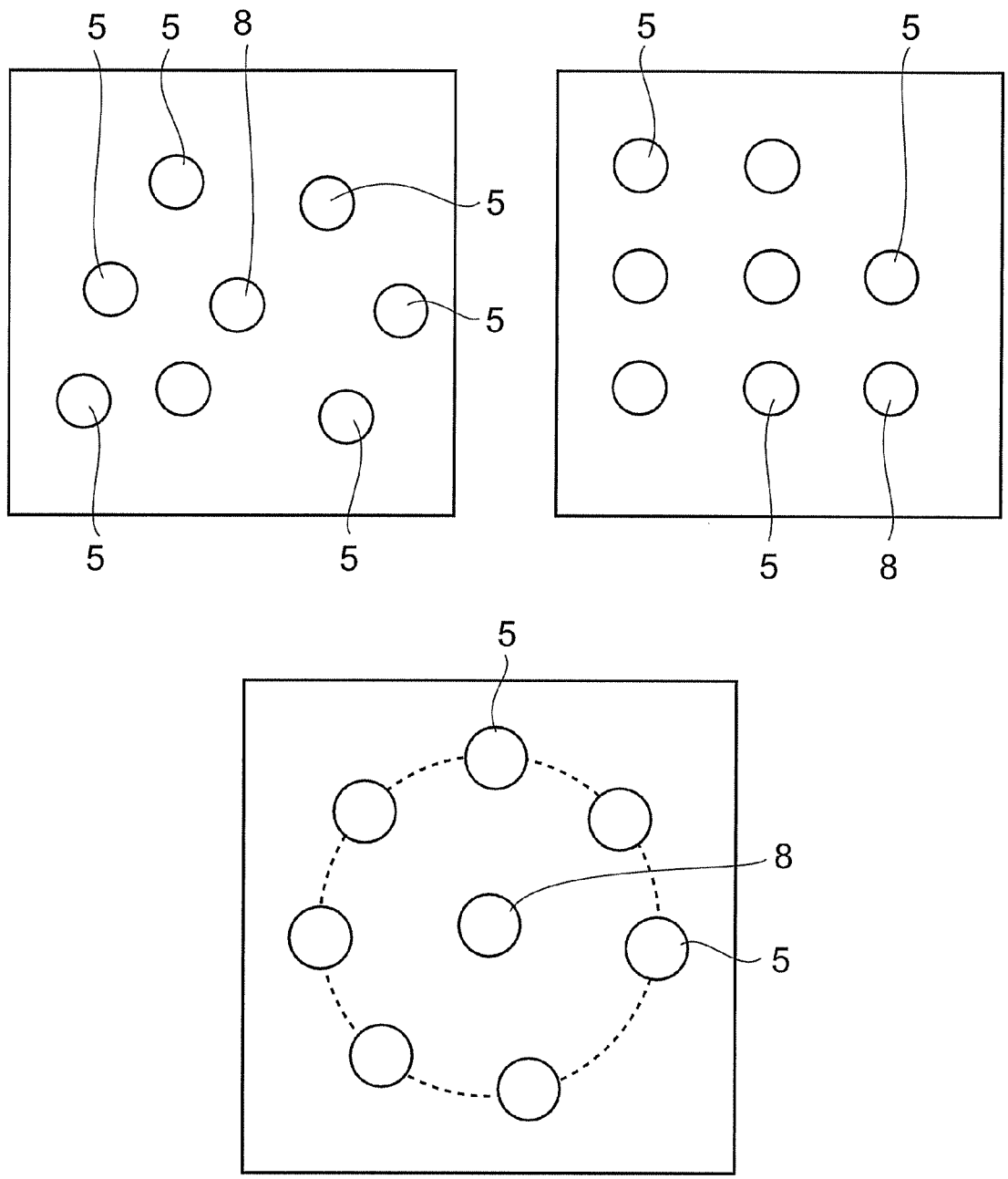
FIG. 26 is a plan view schematically illustrating a computing unit of the 2-bit adder according to the second embodiment.

FIGS. 26A to 26C are plan views schematically showing the configuration of the computing unit 56 in the 2-bit adder shown in FIG. 25. The computing unit 56 performs a threshold logic operation in accordance with Equation 2. More specifically, in response to input of A(0), B(0), C(−1), and two A(1) and two B(1), the computing unit 56 outputs C(1). That is, the computing unit 56 is a 7-input 1-output computing unit. As shown in FIGS. 26A to 26C, the computing unit 56 includes seven input sections 5 and one wave detector 8. The spin waves excited in the respective input sections 5 are combined at the position of the wave detector 8, which outputs a signal corresponding to the composite wave. Here, if the signal intensity detected in the wave detector 8 is higher than the level corresponding to threshold 4, a computation result corresponding to "1" is outputted in accordance with Equation 2. If the signal level falls below threshold 4, a computation result corresponding to "0" is outputted.

$$C_m = \begin{cases} 1 & \text{if } 2A_1 + 2B_1 + A_0 + B_0 + C_{-1} \geq 4 \\ 0 & \text{if } 2A_1 + 2B_1 + A_0 + B_0 + C_{-1} \leq 3 \end{cases} \quad \text{[Equation 2]}$$

As described above, the spacing between the input section 5 and the wave detector 8 can be narrower than the wavelength of the spin wave. Furthermore, the propagation characteristic of the spin wave can be isotropic, and the propagation loss can be low. Then, the input sections 7 and the wave detector 8 can be arbitrarily arranged as shown in FIGS. 26A and 26B. Alternatively, as shown in FIG. 26C, the input sections 5 may be arranged at equal distances around the wave detector 8.

Third Embodiment

Figure 27:
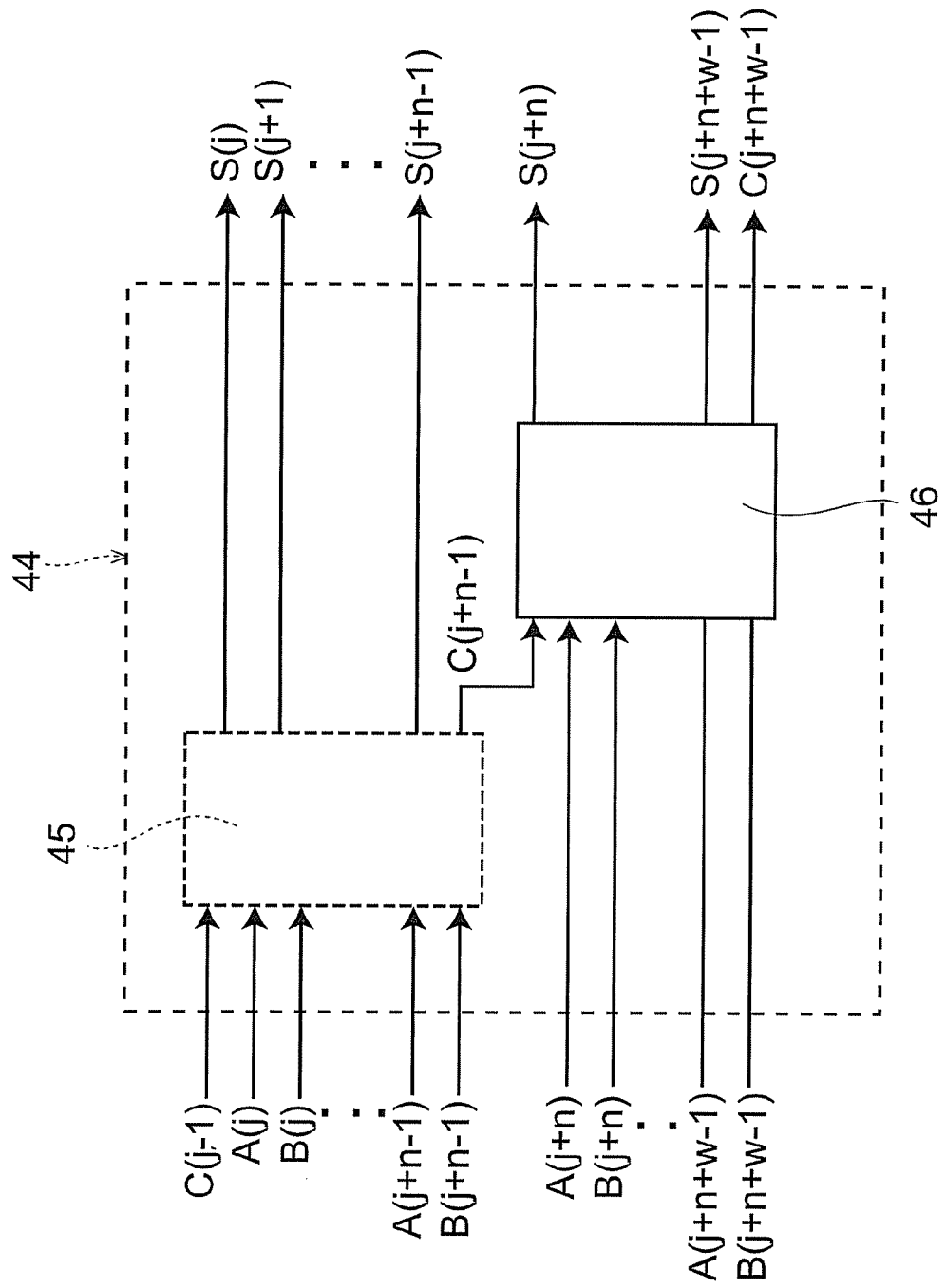
FIG. 27 is a block diagram illustrating an adder according to a third embodiment.

FIG. 27 is a block diagram showing an m-bit adder 44 according to a third embodiment. The adder 44 according to this embodiment includes q sub-adders (q is an integer of 1 or more). For instance, FIG. 27 shows an example for q=2, including a sub-adder 45 and a sub-adder 46.

The sub-adder according to this embodiment includes first to n-th addition computing units and a carry computing unit. In response to input of signals corresponding to the bit values A[j] to A[j+n−1] and B[j] to B[j+n−1] of the j-th to (j+n−1)-th positions of binary values A and B, and a carry bit value C[j−1], the first to n-th addition computing units output computation results S(j) to S(j+n−1), and the carry computing unit outputs a computation result C(j+n−1) corresponding to the carry bit value C[j+n−1]. Here, j and n are integers, and $i \leq j$, $j+n \leq i+m$.

The first addition computing unit inputs signals corresponding to two of A[j], B[j], and C[j−1] to the first wave computing unit and causes it to output X(j). Furthermore, the first addition computing unit inputs a signal corresponding to the remaining one of A[j], B[j], and C[j−1] not inputted to the first wave computing unit, and X(j) to the second wave computing unit and causes it to output the S(j).

The p-th adder (p is an integer of 1 to n) inputs A(j) to A(j+p−2), B(j) to B(j+p−2), and C(j−1) to the threshold wave computing unit and causes it to output C(j+p−2). Furthermore, the p-th adder inputs A(j+p−1) and B(j+p−1) to the first wave computing unit and causes it to output X(j+p−1). Furthermore, the p-th adder inputs C(j+p−2) and X(j+p−1) to the second wave computing unit and causes it to output S(j+p−1).

Furthermore, the carry computing unit inputs A(j) to A(j+n−1), B(j) to B(j+n−1), and C(j−1) to the threshold wave computing unit and causes it to output C(i+n−1).

The sub-adder 45 shown in FIG. 27 is an n-bit sub-adder. In response to input of A(j) to A(j+n−1), B(j) to B(j+n−1), and C(j−1), the sub-adder 45 outputs S(j) to S(j+n−1), and C(j+n−1). The sub-adder 46 is a w-bit sub-adder. In response to input of A(j+n) to A(j+n+w−1), B(j+n) to B(j+n+w−1), and C(j+n−1), the sub-adder 46 outputs S(j+n) to S(j+n+w−1), and C(j+n+w−1). Here, w is an integer of 1 or more, and n+w=m.

For instance, for n=4 and w=4, the sub-adders 45 and 46 are 4-bit sub-adders. Then, the adder 44 can be regarded as an 8-bit adder. In response to input of A(0) to A(7), B(0) to B(7), and C(−1), the adder 44 outputs S(0) to S(7), and C(7).

Figure 28:
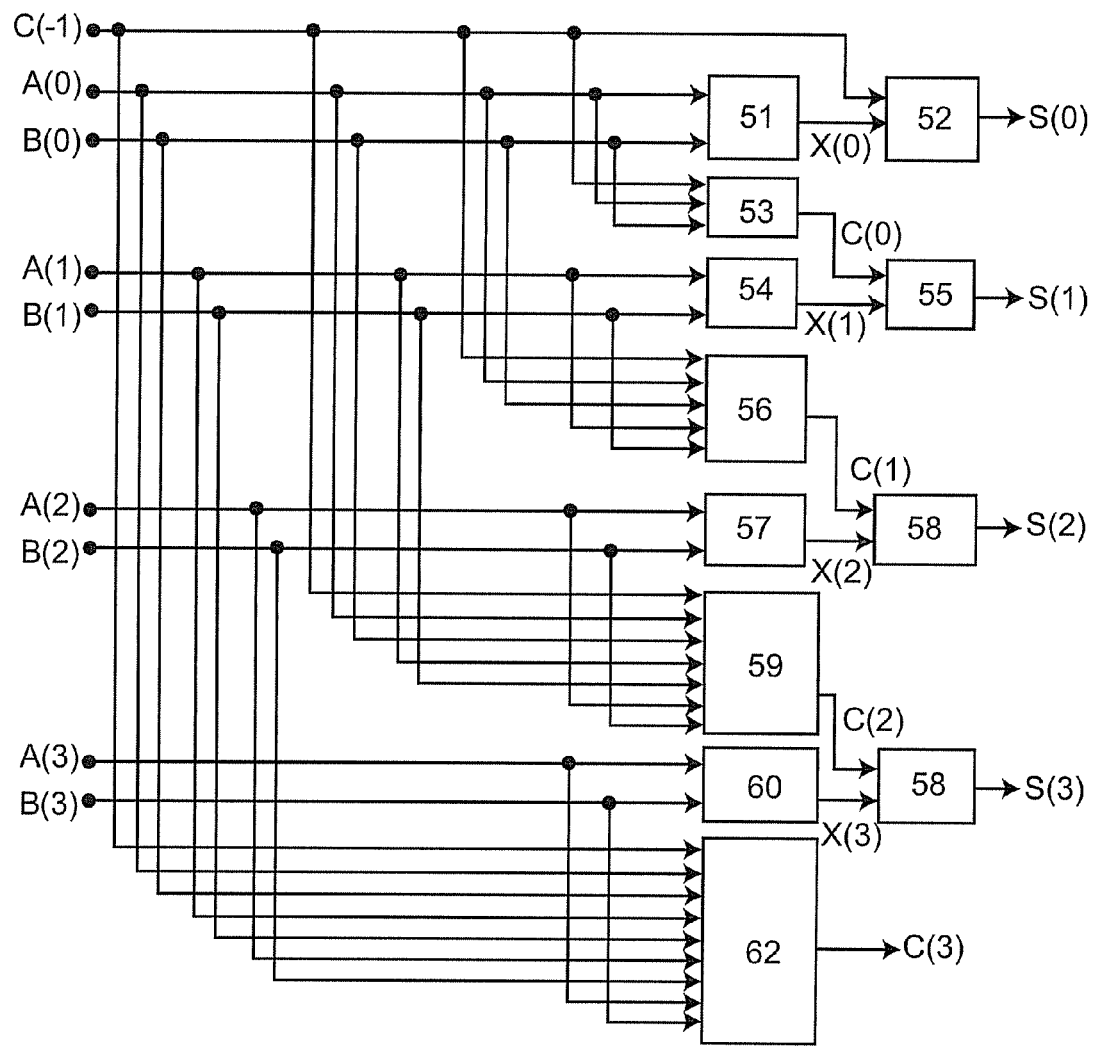
FIG. 28 is a block diagram illustrating a 4-bit sub-adder according to the third embodiment.

FIG. 28 is a block diagram showing the configuration of a 4-bit sub-adder 45a. The 4-bit sub-adder 45a includes computing units 51 to 62. In response to input of A(0) to A(3), B(0) to B(3), and C(−1), the 4-bit sub-adder 45a outputs S(0) to S(3), and C(3). The computing unit 51, the computing unit 54, the computing unit 57, and the computing unit 60 are first wave computing units. The computing unit 52, the computing unit 55, the computing unit 58, and the computing unit 61 are second wave computing units. The computing unit 53, the computing unit 56, the computing unit 59, and the computing unit 62 are threshold wave computing units.

The first addition computing unit is composed of the computing unit 51 and the computing unit 52. The computing unit 51 receives input of A(0) and B(0), and outputs X(0). The computing unit 52 receives input of C(−1) and X(0), and outputs S(0). As shown in FIG. 2, even if the inputs B(0) and C(−1) are interchanged, the output S(0) does not change.

The second addition computing unit is composed of the computing unit 53, the computing unit 54, and the computing unit 55. The computing unit 53 receives input of A(0), B(0), and C(−1), and outputs C(0). The computing unit 54 receives input of A(1) and B(1), and outputs X(1). The computing unit 55 receives input of C(0) and X(1), and outputs S(1). Furthermore, the third addition computing unit is composed of the computing unit 56, the computing unit 57, and the computing unit 58. The fourth addition computing unit is composed of the computing unit 59, the computing unit 60, and the computing unit 61.

On the other hand, the computing unit 62 is a carry computing unit. The computing unit 62 receives input of A(0) to A(3), B(0) to B(3), and C(−1), and outputs C(3).

Furthermore, the adder 44 can be configured as a 16-bit adder including four 4-bit sub-adders. Alternatively, the adder 44 can be configured as a 16-bit adder including two 8-bit sub-adders. Here, the number of bits of the sub-adders 45 and 46 can be increased by adding an addition computing unit by the same rule as the 4-bit sub-adder 45a. As an alternative configuration, the sub-adder may be regarded as the adder 44, which may further include a sub-adder.

The invention has been described above with reference to the first to third embodiments. However, the invention is not limited to these embodiments.

For instance, any configurations for specific dimensions and materials of the components constituting the continuous film, and the shape and material of e.g. the electrode, protective film, and insulating film are encompassed within the scope of the invention as long as those skilled in the art can practice the invention and achieve similar effects by suitably selecting such configurations based on the state of the art at the time of filing of this application.

Furthermore, in the first to third embodiments, for instance, the configuration shown in the figure can be turned upside down. The components such as the antiferromagnetic layer, intermediate layer, and insulating layer in the continuous film may be configured as a single layer, or may have a structure in which two or more layers are stacked.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An adder comprising:
   a first wave computing unit including:
      a pair of first input sections receiving signals corresponding to two bit values selected from A[i+k−1], B[i+k−1] and C[i+k−2], the A[i+k−1] being the bit value of the (i+k−1)-th position of a binary value A, the B[i+k−1] being the bit value of the (i+k−1)-th position of the binary value B, and the C[i+k−2] being a carry bit value from the (i+k−2)-th position to the (i+k−1)-th position resulting from addition of the binary value A and the binary value B (i and k being integers);
      a first wave transmission medium having a continuous film including a magnetic body connected to the first input sections; and
      a first wave detector outputting X(k−1) as a result of computation by spin waves induced in the first wave transmission medium by the signals corresponding to the two bit values;
   a second wave computing unit including:
      a pair of second input sections receiving a signal corresponding to the bit value not selected as the input to the first input sections among the A[i+k−1], B[i+k−1] and C[i+k−2], and the output X(k−1);
      a second wave transmission medium having a continuous film including a magnetic body connected to the second input sections; and
      a second wave detector outputting S(k−1) as a result of computation by spin waves induced in the second wave transmission medium by the signal corresponding to the bit value not selected and the output X(k−1); and
   a threshold wave computing unit including:
      a plurality of third input sections receiving signals corresponding to the A[i] to A[i+k−1], the B[i] to B[i+k−1], and the carry bit value C[i−1];
      a third wave transmission medium having a continuous film including a magnetic body connected to the third input sections; and
      a third wave detector outputting C(k−1) as a result of computation by spin waves induced in the third wave transmission medium by the signals corresponding to the A[i] to A[i+k−1], B[i] to B[i+k−1], and C[i−1].

2. The adder according to claim 1, further comprising:
   a sub-adder including:
      first to n-th addition computing units outputting the computation results S(j) to S(j+n−1) in response to the signals corresponding to the bit values A[j] to A[j+n−1] of the j-th to (j+n−1)-th positions of the binary value A (j and n being integers, i≤j), the bit values B[j] to B[j+n−1] of the j-th to (j+n−1)-th positions of the binary value B, and the carry bit value C[j−1]; and
      a carry computing unit outputting a computation result C(j+n−1) corresponding to the carry bit value C[j+n−1],
   wherein the first addition computing unit is configured:
      to input signals corresponding to two of the A[j], B[j], and C[j−1] to the first wave computing unit and causing the first wave computing unit to output the X(j); and
      to input a signal corresponding to the remaining one of the A[j], B[j], and C[j−1] not inputted to the first wave computing unit, and the X(j) to the second wave computing unit and causing the second wave computing unit to output the S(j), the p-th addition computing unit (p being an integer, 1<p≤n) is configured:
- to input signals corresponding to the A[j] to A[j+p−2], the B[j] to B[j+p−2], and the C[j−1] to the threshold wave computing unit and causing the threshold wave computing unit to output the C(j+p−2);
- to input signals corresponding to the A[j+p−1] and the B[j+p−1] to the first wave computing unit and causing the first wave computing unit to output the X(j+p−1); and
- to input signals corresponding to the C(j+p−2) and the X(j+p−1) to the second wave computing unit and causing the second wave computing unit to output the S(j+p−1), and the carry computing unit is configured:
- to input signals corresponding to the A[j] to A[j+p−1], B[j] to B[j+p−1], and the C[j−1] to the threshold wave computing unit and causing the threshold wave computing unit to output the C(j+p−1).

3. The adder according to claim 1, wherein spacings from the input sections to the wave detector are equal in at least one of the first computing unit and the second computing unit.

4. The adder according to claim 1, wherein difference of spacings from the plurality of the input sections to the wave detector is equal to an odd multiple of a half wavelength of a wave induced in the wave transmission medium in at least one of the first computing unit and the second computing unit.

5. The adder according to claim 1, wherein spacings from the plurality of the input sections to the wave detector are narrower than twice a diameter of the input section in at least one of the first computing unit, the second computing unit and the threshold wave computing unit.

6. The adder according to claim 1, wherein at least one of the first wave computing unit, the second wave computing unit, and the threshold wave computing unit includes a detector configured to output a result of comparing a signal corresponding to a local amplitude of the spin wave induced in the wave transmission medium with a prescribed threshold.

7. The adder according to claim 6, wherein at least one of the first wave computing unit, the second wave computing unit, and the threshold wave computing unit includes an amplifier configured to amplify the signal corresponding to the local amplitude of the spin wave induced in the wave transmission medium.

8. The adder according to claim 1, wherein at least one of the first wave computing unit, the second wave computing unit, and the threshold wave computing unit includes a rectifier configured to rectify a signal corresponding to a local amplitude of the wave induced in the wave transmission medium.

9. The adder according to claim 1, wherein each of the first input section, the second input section and the third input section is connected to the wave transmission medium via a region smaller than a circle having a diameter of 200 nm.

10. The adder according to claim 1, wherein each of the first wave computing unit, the second wave computing unit, and the threshold wave computing unit includes an external magnetic field imparting section configured to impart an external magnetic field applied to the wave transmission medium.

11. The adder according to claim 10, wherein at least one of the first wave transmission medium, the second wave transmission medium and the third wave transmission medium includes two magnetic layers and a spacer layer provided therebetween, wherein magnetic fields of the two magnetic layers cross each other at an angle between 60 degrees and 120 degrees.

12. The adder according to claim 10, wherein the magnetization of the magnetic layer in which the spin wave is propagated is perpendicular to a surface of the continuous film.

13. The adder according to claim 1, wherein at least one of the first wave detector, the second wave detector and the third wave detector includes coplanar lines.

14. The adder according to claim 1, wherein at least one of the first wave detector, the second wave detector and the third wave detector includes a wiring made of a non-magnetic conductive material.

15. The adder according to claim 1, wherein the first wave detector, the second wave detector and the third wave detector have a size smaller than twice a diameter of the input section in each of the first computing unit, the second computing unit and the threshold wave computing unit.

16. The adder according to claim 1, wherein the first wave computing unit and the second wave computing unit perform exclusive OR operation.

17. The adder according to claim 1, wherein
the third wave computing unit performs a threshold computation based on an output corresponding to number of spin waves induced by a plurality of signals at the third input sections.

18. An adder comprising:
a first wave computing unit including:
- a pair of first input sections receiving signals corresponding to two bit values selected from A[i+k−1], B[i+k−1] and C[i+k−2], the A[i+k−1] being the bit value of the (i+k−1)-th position of a binary value A, the B[i+k−1] being the bit value of the (i+k−1)-th position of a binary value B, and the C[i+k−2] being a carry bit value from the (i+k−2)-th position to the (i+k−1)-th position resulting from addition of the binary value A and the binary value B (i and k being an integer);
- a first wave transmission medium having a continuous film including a piezoelectric body connected to the first input sections; and
- a first wave detector configured to output X(k−1) as a result of computation by elastic waves induced in the first wave transmission medium by the signals corresponding to the two bit values;

a second wave computing unit including:
- a pair of second input sections receiving a signal corresponding to the bit value not selected as the input to the first input section among the A[i+k−1], B[i+k−1] and C[i+k−2], and the output X(k−1);
- a second wave transmission medium having a continuous film including a piezoelectric body connected to the second input sections; and
- a second wave detector outputting S(k−1) as a result of computation by elastic waves induced in the second wave transmission medium by the signal corresponding to the bit value not selected and the output X(k−1); and a threshold wave computing unit including:
- a plurality of third input sections receiving signals corresponding to the A[i] to A[i+k−1], the B[i] to B[i+k−1], and the carry bit value C[i−1];

a third wave transmission medium having a continuous film including a piezoelectric body connected to the third input sections; and a third wave detector outputting $C(k-1)$ as a result of computation by elastic waves induced in the third wave transmission medium by the signals corresponding to the $A[i]$ to $A[i+k-1]$, the $B[i]$ to $B[i+k-1]$, and the $C[i-1]$.

19. The adder according to claim 18, wherein each of the first input sections, the second input sections, and the third input sections includes an electrode pair composed of a first electrode and a second electrode, and each of the first wave detector, the second wave detector, and the third wave detector includes a pair of comb-shaped electrodes meshed with each other.

20. The adder according to claim 19, wherein the comb-shaped electrodes are orthogonal to propagation direction of the elastic wave, and spacing between the first electrode and the second electrode is equal to spacing between the pair of comb-shaped electrodes in the propagation direction of the elastic wave.

* * * * *